US008900507B2

(12) United States Patent
Melamed et al.

(10) Patent No.: US 8,900,507 B2
(45) Date of Patent: Dec. 2, 2014

(54) LASER-IMAGEABLE FLEXOGRAPHIC PRINTING PRECURSORS AND METHODS OF IMAGING

(75) Inventors: Ophira Melamed, Shoham (IL); Ido Gal, Kafar-Saba (IL); Limor Dahan, Tel Aviv (IL)

(73) Assignee: Eastman Kodak Company, Rochester, NY (US)

( * ) Notice: Subject to any disclaimer, the term of this patent is extended or adjusted under 35 U.S.C. 154(b) by 184 days.

(21) Appl. No.: 13/173,430

(22) Filed: Jun. 30, 2011

(65) Prior Publication Data

US 2013/0001832 A1    Jan. 3, 2013

(51) Int. Cl.
| | |
|---|---|
| B29C 35/08 | (2006.01) |
| H01B 1/24 | (2006.01) |
| B32B 3/00 | (2006.01) |
| B32B 9/04 | (2006.01) |
| C08L 23/16 | (2006.01) |
| C08K 3/26 | (2006.01) |
| C08K 3/04 | (2006.01) |
| B32B 15/04 | (2006.01) |
| B32B 5/02 | (2006.01) |

(52) U.S. Cl.
CPC . *C08L 23/16* (2013.01); *C08K 3/04* (2013.01); *B32B 9/04* (2013.01); *B32B 15/04* (2013.01); *B32B 5/024* (2013.01)
USPC ........ 264/400; 524/576; 524/426; 252/501.1; 252/511; 425/174; 428/411.1; 428/457; 428/332; 428/221

(58) Field of Classification Search
USPC ................... 264/400; 425/174; 524/576, 426; 252/511, 501.1
See application file for complete search history.

(56) References Cited

U.S. PATENT DOCUMENTS

| | | | |
|---|---|---|---|
| 4,934,267 A | 6/1990 | Hashimoto et al. | |
| 5,719,009 A | 2/1998 | Fan | |
| 5,798,202 A | 8/1998 | Cushner et al. | |
| 6,159,659 A | 12/2000 | Gelbart | |
| 6,223,655 B1 | 5/2001 | Shanbaum et al. | |
| 6,776,095 B2 | 8/2004 | Telser et al. | |
| 6,806,018 B2 | 10/2004 | Kanga et al. | |
| 6,913,869 B2 | 7/2005 | Leinenbach et al. | |
| 6,935,236 B2 | 8/2005 | Hiller et al. | |
| 7,223,524 B2 | 5/2007 | Hiller et al. | |
| 7,290,487 B2 | 11/2007 | Hiller | |
| 2002/0018958 A1 | 2/2002 | Nishioka et al. | |
| 2008/0194762 A1 | 8/2008 | Sugasaki | |
| 2008/0258344 A1 | 10/2008 | Regan et al. | |
| 2009/0214984 A1 | 8/2009 | Ling et al. | |

FOREIGN PATENT DOCUMENTS

EP    1 228 864    4/2004

OTHER PUBLICATIONS

Mitra et al. "Structural Determination of Ethylene-Propylene-Diene Rubber (EPDM) Containing High Degree of Controlled Long-Chain Branching," J. Appl. Polym. Sci., vol. 113, 2962-2972 (2009).*
U.S. Appl. No. 12/748,475, filed Mar. 29, 2010 titled Flexographic Printing Precursors and Methods of Making by Melamed et al.
AkzoNobel "Crosslinking elastomers and thermoplastics" (2010).
Jahani et al., *Iranian Polymer Journal* 14(8), 2005, 693-704.
Meijers et al., *Elastomers and Plastics* (KGK KAutschuk Gummi Kunststoffe), 52, Jahrgang, Nr. 10/99, 663-669.
Hofkens et al., *EPDM that meets compounding challenges* (Rubber & Plastics News, Jan. 25, 2010).

* cited by examiner

*Primary Examiner* — Ling Choi
*Assistant Examiner* — Catherine S Branch
(74) *Attorney, Agent, or Firm* — J. Lanny Tucker

(57) ABSTRACT

A laser-engraveable composition comprises one or more elastomeric rubbers including at least 10 parts of one or more CLCB EPDM elastomeric rubbers, based on parts per hundred of the total weight of elastomeric rubbers (phr). The laser-engraveable composition further comprises 2-30 phr of a near-infrared radiation absorber and either 1-80 phr of an inorganic, non-infrared radiation absorber filler, or a vulcanizing composition that comprises a mixture of at least two peroxides. One first peroxide has a $t_{90}$ value of 1-6 minutes as measured at 160° C., and a second peroxide has a $t_{90}$ value of 8-20 minutes as measured at 160° C. This laser-engraveable composition can be used to form various flexographic printing precursors that can be laser-engraved to provide relief images in flexographic printing plates, printing cylinders, or printing sleeves.

22 Claims, No Drawings

LASER-IMAGEABLE FLEXOGRAPHIC PRINTING PRECURSORS AND METHODS OF IMAGING

FIELD OF THE INVENTION

This invention relates to laser-imageable (laser-engraveable) flexographic printing precursors comprising a unique laser-engraveable layer composition. This invention also relates to methods of imaging these flexographic printing precursors to provide flexographic printing members in printing plate, printing cylinder, or printing sleeve form.

BACKGROUND OF THE INVENTION

Flexography is a method of printing that is commonly used for high-volume printing runs. It is usually employed for printing on a variety of soft or easily deformed materials including but not limited to, paper, paperboard stock, corrugated board, polymeric films, fabrics, metal foils, and laminates. Coarse surfaces and stretchable polymeric films are economically printed using flexography.

Flexographic printing members are sometimes known as "relief" printing members (for example, relief-containing printing plates, printing sleeves, or printing cylinders) and are provided with raised relief images onto which ink is applied for application to a printable material. While the raised relief images are inked, the relief "floor" should remain free of ink. The flexographic printing precursors are generally supplied with one or more imageable layers that can be disposed over a backing layer or substrate. Flexographic printing also can be carried out using a flexographic printing cylinder or seamless sleeve having the desired relief image. These flexographic printing members can be provided from flexographic printing precursors that can be "imaged in-the-round" (ITR) using either a photomask or laser-ablatable mask (LAM) over a photosensitive composition (layer), or they can be imaged by direct laser engraving (DLE) of a laser-engraveable composition (layer) that is not necessarily photosensitive.

Flexographic printing precursors having laser-ablatable layers are described for example in U.S. Pat. No. 5,719,009 (Fan), which precursors include a laser-ablatable mask layer over one or more photosensitive layers. This publication teaches the use of a developer to remove unreacted material from the photosensitive layer, the barrier layer, and non-ablated portions of the mask layer.

There has been a desire in the industry for a way to prepare flexographic printing members without the use of photosensitive layers that are cured using UV or actinic radiation and that require liquid processing to remove non-imaged composition and mask layers. Direct laser engraving of precursors to produce relief printing plates and stamps is known, but the need for relief image depths greater than 500 μm creates a considerable challenge when imaging speed is also an important commercial requirement. In contrast to laser ablation of mask layers that require low to moderate energy lasers and fluence, direct engraving of a relief-farming layer requires much higher energy and fluence. A laser-engraveable layer must also exhibit appropriate physical and chemical properties to achieve "clean" and rapid laser engraving (high sensitivity) so that the resulting printed images have excellent resolution and durability.

A number of elastomeric systems have been described for construction of laser-engravable flexographic printing precursors. For example, U.S. Pat. No. 6,223,655 (Shanbaum et al.) describes the use of a mixture of epoxidized natural rubber and natural rubber in a laser-engraveable composition. Engraving of a rubber is also described by S. E. Nielsen in *Polymer Testing* 3 (1983) pp. 303-310.

U.S. Pat. No. 4,934,267 (Hashimito) describes the use of a natural or synthetic rubber, or mixtures of both, such as acrylonitrile-butadiene, styrene-butadiene and chloroprene rubbers, on a textile support. "Laser Engraving of Rubbers—The Influence of Fillers" by W. Kern et al., October 1997, pp. 710-715 (Rohstoffe Und Anwendendunghen) describes the use of natural rubber, nitrile rubber (NBR), ethylene-propylene-diene terpolymer (EPDM), and styrene-butadiene copolymer (SBR) for laser engraving.

EP 1,228,864A1 (Houstra) describes liquid photopolymer mixtures that are designed for UV imaging and curing, and the resulting printing plate precursors are laser-engraved using carbon dioxide lasers operating at about 10 μm wavelength. Such printing plate precursors are unsuitable for imaging using more desirable near-IR absorbing laser diode systems. U.S. Pat. No. 5,798,202 (Cushner et al.) describes the use of reinforced block copolymers incorporating carbon black in a layer that is UV cured and remains thermoplastic. Such block copolymers are used in many commercial UV-sensitive flexographic printing plate precursors. As pointed out in U.S. Pat. No. 6,935,236 (Hiller et al.), such curing would be defective due to the high absorption of UV as it traverses through the thick imageable layer. Although many polymers are suggested for this use in the literature, only extremely flexible elastomers have been used commercially because flexographic layers that are many millimeters thick must be designed to be bent around a printing cylinder and secured with temporary bonding tape and both must be removable after printing.

U.S. Pat. No. 6,776,095 (Telser et al.) describes elastomers including an EPDM rubber and U.S. Pat. No. 6,913,869 (Leinenbach et al.) describes the use of an EPDM rubber for the production of flexographic printing plates having a flexible metal support. U.S. Pat. No. 7,223,524 (Hiller et al.) describes the use of a natural rubber with highly conductive carbon blacks. U.S. Pat. No. 7,290,487 (Hiller et al.) lists suitable hydrophobic elastomers with inert plasticizers. U.S. Patent Application Publication 2002/0018958 (Nishioki et al.) describes a peelable layer and the use of rubbers such as EPDM and NBR together with inert plasticizers such as mineral oils. The use of inert plasticizers or mineral oils can present a problem as they leach out either during precursor grinding (during manufacture) or storage, or under pressure and contact with ink during printing.

An increased need for higher quality flexographic printing precursors for laser engraving has highlighted the need to solve performance problems that were of less importance when quality demands were less stringent. However, it has been especially difficult to simultaneously improve the flexographic printing precursor in various properties because a change that can solve one problem can worsen or cause another problem.

For example, the rate of imaging is now an important consideration in laser engraving of flexographic printing precursors. Throughput (rate of imaging multiple precursors) by engraving depends upon printing plate precursor width because each precursor is imaged point by point. Imaging, multi-step processing, and drying of UV-sensitive precursors is time consuming but this process is independent of printing plate size, and for the production of multiple flexographic printing plates, it can be relatively fast because many flexographic printing plates can be passed through the multiple stages at the same time.

In contrast, throughput using laser-engraving is somewhat determined by the equipment that is used, but if this is the means for improving imaging speed, the cost becomes the main concern. Improved imaging speed is thus related to equipment cost. There is a limit to what the market will bear in equipment cost in order to have faster imaging. Therefore, much work has been done to try to improve the sensitivity of the flexographic printing plate precursors by various means. For instance, U.S. Pat. No. 6,159,659 (Gelbart) describes the use of a foam layer for laser engraving so that there is less material to ablate. U.S. Pat. No. 6,806,018 (Kanga) uses expandable microspheres to increase precursor sensitivity.

U.S. Patent Application Publication 2009/0214983 (Figov et al.) describes the use of additives that thermally degrade during imaging to produce gaseous products. U.S. Patent Application Publication 2008/0194762 (Sugasaki) suggests that good imaging sensitivity can be achieved using a polymer with a nitrogen atom-containing hetero ring. U.S. Patent Application Publication 2008/0258344 (Regan et al.) describes laser-ablatable flexographic printing precursors that can be degraded to simple molecules that are easily removed.

Copending and commonly assigned U.S. Ser. No. 12/748,475 (filed Mar. 29, 2010 by Melamed, Gal, and Dahan) describes flexographic printing precursors having laser-engraveable layers that include mixtures of high and low molecular weight EPDM rubbers, which mixtures provide improvements in performance and manufacturability.

As flexographic imaging (sensitivity) is improved, the need for print quality and consistency increases. In addition, there is a need to make manufacturing as consistent as possible. Laser-engraveable compositions to be compounded tend to have relatively high viscosity, presenting challenges in ensuring excellent mixing of the essential components. This problem is addressed with the invention described in U.S. Ser. No. 12/748,475 noted above by incorporating a low viscosity EPDM rubber into the composition. Compression recovery can then be a challenge because a good compression rate and printability are generally associated with high molecular weight elastomers in relatively high viscosity compositions.

However, there continues to be a need to improve both the sensitivity and manufacturability of laser-engraveable flexographic printing precursors using laser-engraveable compositions having a suitable viscosity and compression recovery. It would be particularly useful to achieve these advantages using near-IR laser-engraving because of the advantages associated with the use of near-IR lasers compared to engraving using carbon dioxide lasers.

SUMMARY OF THE INVENTION

Some of the problems described above can be solved using a laser-engraveable composition comprising one or more elastomeric rubbers in an amount of at least 30 weight % and up to and including 80 weight %, based on the total dry laser-engraveable composition weight, wherein the laser-engraveable composition further comprises at least 10 parts and up to and including 100 parts of one or more CLCB EPDM elastomeric rubbers, based on parts per hundred of the total weight of elastomeric rubbers (phr) in the laser-engraveable composition, wherein the laser-engraveable composition further comprises at least one radiation absorber, and a vulcanizing composition chosen from the group consisting of: (1) a sulfur composition, (2) a peroxide composition, or (3) a composition comprising a mixture of a sulfur composition and a peroxide composition.

This laser-engraveable composition can be formulated into an elastomeric layer in a flexographic printing precursor that is laser-engraveable to form a relief image, with or without a substrate for supporting the laser-engraveable layer. Such flexographic printing precursors can be flexographic printing plate precursors, flexographic printing cylinder precursors, or flexographic printing sleeve precursors, as described below.

In particularly useful embodiments, a laser-engraveable composition comprises one or more elastomeric rubbers in an amount of at least 30 weight % and up to and including 80 weight %, based on the total dry laser-engraveable composition weight, wherein the laser-engraveable composition further comprises at least 10 parts and up to and including 100 parts of one or more CLCB EPDM elastomeric rubbers, based on parts per hundred of the total weight of elastomeric rubbers (phr) in the laser-engraveable composition, the laser-engraveable composition further comprising one or both of the following components a) and b):

a) at least 2 phr and up to and including 30 phr of a near-infrared radiation absorber and at least 1 phr and up to and including 80 phr of an inorganic, non-infrared radiation absorber filler, wherein the weight ratio of the near-infrared radiation absorber to the inorganic, non-infrared radiation absorber filler is from 1:40 to 30:1, and b) at least 2 phr and up to and including 30 phr of a near-infrared radiation absorber, and at least 3 phr and up to and including 20 phr of a vulcanizing composition that comprises a mixture of at least first and second peroxides, wherein the first peroxide has a $t_{90}$ value of at least 1 minute and up to and including 6 minutes as measured at 160° C., and the second peroxide has a $t_{90}$ value of at least 8 minutes and up to and including 20 minutes as measured at 160° C., and wherein the weight ratio of the near-infrared radiation absorber to the vulcanizing composition is from 1:10 to 10:1.

The present invention also provides a flexographic printing precursor that is laser-engraveable to provide a relief image, the flexographic printing precursor comprising a laser-engraveable layer prepared from a laser-engraveable composition comprising one or more elastomeric rubbers in an amount of at least 30 weight % and up to and including 80 weight %, based on the total laser-engraveable composition weight, the laser-engraveable composition comprising at least 10 parts and up to and including 100 parts of one or more CLCB EPDM elastomeric rubbers, based on parts per hundred of the total weight of elastomeric rubbers (phr) in the laser-engraveable composition, the laser-engraveable composition further comprising one or both of the following components a) and b):

a) at least 2 phr and up to and including 30 phr of a near-infrared radiation absorber and at least 1 phr and up to and including 80 phr of an inorganic, non-infrared radiation absorber filler, wherein the weight ratio of the near-infrared radiation absorber to the inorganic, non-infrared radiation absorber filler is from 1:40 to 30:1, and b) at least 2 phr and up to and including 30 phr of a near-infrared radiation absorber, and at least 3 phr and up to and including 20 phr of a vulcanizing composition that comprises a vulcanizing composition that comprises a mixture of at least first and second peroxides, wherein the first peroxide has a $t_{90}$ value of at least 1 minute and up to and including 6 minutes as measured at 160° C., and the second peroxide has a $t_{90}$ value of at least 8 minutes and up to and including 20 minutes as measured at 160° C., and wherein the weight ratio of the near-infrared radiation absorber to the vulcanizing composition is from 1:10 to 10:1.

This invention also provides a method for providing a flexographic printing member comprising:

imaging the laser-engraveable layer of the flexographic printing precursor described herein (for example as described above) using near-infrared radiation to provide a flexographic printing member with a relief image in the resulting laser-engraved layer.

Moreover, this invention also provides a system for providing a flexographic printing member, comprising:

the flexographic printing precursor described herein (for example, as described above), a source of imaging near-infrared radiation that is capable of emitting imaging near-infrared radiation and that is selected from the group consisting of a laser diode, a multi-emitter laser diode, a laser bar, a laser stack, a fiber laser, or a combination thereof, and a set of optical elements coupled to the one or more sources of imaging near-infrared radiation to direct imaging near-infrared radiation from the one or more sources of imaging near-infrared radiation onto the flexographic printing member.

In some embodiments, a method for preparing the flexographic printing precursor described herein for this invention comprises:

providing a laser-engraveable composition comprising one or more elastomeric rubbers in an amount of at least 30 weight % and up to and including 80 weight %, based on the total dry laser-engraveable composition weight, the laser-engraveable composition further comprising at least 10 parts and up to and including 100 parts of one or more CLCB EPDM elastomeric rubbers, based on parts per hundred of the total weight of elastomeric rubbers (phr) in the laser-engraveable composition, the laser-engraveable composition further comprising one or both of the following components a) and b):

a) at least 2 phr and up to and including 30 phr of a near-infrared radiation absorber and at least 1 phr and up to and including 80 phr of an inorganic, non-infrared radiation absorber filler, wherein the weight ratio of the near-infrared radiation absorber to the inorganic, non-infrared radiation absorber filler is from 1:40 to 30:1, and b) at least 2 phr and up to and including 30 phr of a near-infrared radiation absorber, and at least 3 phr and up to and including 20 phr of a vulcanizing composition that comprises a mixture of at least first and second peroxides, wherein the first peroxide has a $t_{90}$ value of at least 1 minute and up to and including 6 minutes as measured at 160° C., and the second peroxide has a $t_{90}$ value of at least 8 minutes and up to and including 20 minutes as measured at 160° C., and wherein the weight ratio of the near-infrared radiation absorber to the vulcanizing composition is from 1:10 to 10:1, and formulating the laser-engraveable composition into a laser-engraveable layer.

Further a method for preparing a flexographic printing precursor comprises:

providing a laser-engraveable composition comprising one or more elastomeric rubbers in an amount of at least 30 weight % and up to and including 80 weight %, based on total dry laser-engraveable composition, the laser-engraveable composition further comprising:

at least 2 phr and up to and including 30 phr of a near-infrared radiation absorber, and at least 3 phr and up to and including 20 phr of a peroxide composition or a composition comprising a mixture of a sulfur composition and a peroxide composition, wherein the weight ratio of the near-infrared radiation absorber to the vulcanizing composition is from 1:10 to 10:1, and the peroxide composition comprises a mixture of at least first and second peroxides, wherein the first peroxide has a $t_{90}$ value of at least 1 minute and up to and including 6 minutes as measured at 160° C., and the second peroxide has a $t_{90}$ value of at least 8 minutes and up to and including 20 minutes as measured at 160° C., and formulating the laser-engraveable composition into a laser-engraveable layer.

It has been found with the present invention that more rapid compression recovery and low composition viscosity can be achieved by the incorporation of CLCB EPDM elastomeric rubbers into the laser-engraveable composition. The CLCB EPDM elastomeric rubbers have controlled long chain branching. These advantages are achieved by suitable formulation of such compounds, particularly with either: component a) at least 2 phr and up to and including 30 phr of a near-infrared radiation absorber and at least 1 phr and up to and including 80 phr of an inorganic, non-infrared radiation absorber filler at a weight ratio of from 1:40 to 30:1, or composition b) of a near-infrared radiation absorber, and a vulcanizing composition that comprises: (1) a sulfur composition, (2) a peroxide composition, or (3) a composition comprising a mixture of a sulfur composition and a peroxide composition, at a weight ratio of the near-infrared radiation absorber to the vulcanizing composition (such as a mixture of first and second peroxides described below) of from 1:5 to 5:1.

Particular advantages of crosslinking density, layer hardness, and optimal manufacturing time are achieved using a weight ratio of the near-infrared radiation absorber to the vulcanizing composition of from 1:10 to 10:1, and the peroxide composition comprises a mixture of at least first and second peroxides, wherein the first peroxide has a $t_{90}$ value of at least 1 minute and up to and including 6 minutes as measured at 160° C., and the second peroxide has a $t_{90}$ value of at least 8 minutes and up to and including 20 minutes as measured at 160° C.

The CLCB EPDM elastomeric rubber can be incorporated into the laser-engraveable composition to improve mixing during manufacturing. In addition, the flexographic printing precursors of this invention can be manufactured with improved consistency with fewer surface defects. The invention composition also exhibits lower swelling in organic solvents such as toluene and mixtures of isopropanol and ethyl acetate. While not being bound to any mechanism, it is believed that the highly ordered chain structure of the CLCB elastomeric rubbers could provide improved crosslinking density that could in turn provide higher torque values (defined below) for the laser-engraveable layer.

In addition, the present invention provides a laser-engraveable composition having lower composition viscosity, and thus providing flexographic printing precursors that have excellent hardness, elongation, compressibility and printability.

Other advantages are provided by lowering of the overall average molecular weight of the elastomeric rubbers in the laser-engraveable layer. During the laser-engraving process, less tar-like agglomerates are produced from these compositions, permitting better collection of debris.

It has also been found that the CLCB EPDM elastomeric rubbers are best used with the noted component a) or b), or both components a) and b). These unique combinations of materials in the laser-engraveable layer provide desired imaging sensitivity, high crosslinking density, and physical properties that influence printing properties such as hardness, compression set, and elongation.

While some embodiments of this invention can be engraved using UV, visible, near-infrared, or carbon dioxide engraving lasers, the laser-engraveable compositions are particularly useful with laser engraving methods using near-infrared radiation sources that have numerous advantages over carbon dioxide lasers such as providing higher resolution images and reduced energy consumption.

DETAILED DESCRIPTION OF THE INVENTION

Definitions

As used herein to define various components of the laser-engraveable compositions, formulations, and layers, unless otherwise indicated, the articles "a", "an", and "the" are intended to include one or more of the components.

The term "imaging" refers to ablation of the background areas while leaving intact the areas of the flexographic printing precursor that will be inked up and printed using a flexographic ink.

The term "flexographic printing precursor" refers to a non-imaged flexographic element of this invention. The flexographic printing precursors include flexographic printing plate precursors, flexographic printing sleeve precursors, and flexographic printing cylinder precursors, all of which can be laser-engraved to provide a relief image using a laser according to the present invention to have a dry relief depth of at least 50 µm and up to and including 4000 µm. Such laser-engraveable, relief-forming precursors can also be known as "flexographic printing plate blanks", "flexographic printing cylinders", or "flexographic sleeve blanks". The laser-engraveable flexographic printing precursois can also have seamless or continuous forms.

By "laser-engraveable", we mean that the laser-engraveable (or imageable) layer can be imaged using a suitable laser-engraving source including infrared radiation lasers, for example carbon dioxide lasers and near-infrared radiation lasers such as Nd:YAG lasers, laser diodes, and fiber lasers. Absorption of energy from these lasers produces heat within the laser-engraveable layer that causes rapid local changes in the laser-engraveable layer so that the imaged regions are physically detached from the rest of the layer or substrate and ejected from the layer and collected using suitable means. Non-imaged regions of the laser-engraveable layer are not removed or volatilized to an appreciable extent and thus form the upper surface of the relief image that is the flexographic printing surface. The breakdown is a violent process that includes eruptions, explosions, tearing, decomposition, fragmentation, oxidation, or other destructive processes that create a broad collection of solid debris and gases. This is distinguishable from, for example, image transfer. "Laser-ablative" and "laser-engraveable" can be used interchangeably in the art, but for purposes of this invention, the term "laser-engraveable" is used to define the imaging according to the present invention in which a relief image is formed in the laser-engraveable layer. It is distinguishable from image transfer methods in which ablation is used to materially transfer pigments, colorants, or other image-forming components. The present invention is also distinguished from laser ablation of a thin layer to create a mask that is used to control the application of curing radiation when it is used to make a flexographic or lithographic printing plate.

Unless otherwise indicated, the term "weight %" refers to the amount of a component or material based on the total dry layer weight of the composition or layer in which it is located.

Unless otherwise indicated, the terms "laser-engraveable composition" and "laser-engravable layer formulation" are intended to be the same.

The term "phr" denotes the relationship between a compound or component in the laser-engraveable layer and the total elastomeric rubber dry weight in that layer and refers to "parts per hundred rubber".

The "top surface" is equivalent to the "relief-image forming surface" and is defined as the outermost surface of the laser-engraveable layer and is the first surface of that layer that is struck by imaging (ablating) radiation during the engraving or imaging process. The "bottom surface" is defined as the surface of the laser-engraveable that is most distant from the imaging radiation.

The term "elastomeric rubber" refers to rubbery materials that generally regain their original shape when stretched or compressed.

The terms "CLCB EPDM elastomeric rubber" and "CLCB" mean the same and refer to EPDM elastomeric rubbers having controlled long chain branching. More details of these materials are provided below. The term "EPDM" is known in the art to refer to an ethylene-propylene-diene terpolymer elastomeric rubber.

Delta torque, $\Delta$ torque ($M_A = M_H - M_L$) is defined as equal to the difference between the measure of the elastic stiffness of the vulcanized test specimen at a specified vulcanizing temperature measured within a specific period of time ($M_H$) and the measure of the elastic stiffness of the non-vulcanized test specimen at the same specified vulcanizing temperature taken at the lower point in the vulcanizing curve ($M_L$), according to ASTM D-5289.

A $t_{90}$ value is known as the time required for a given compound to reach 90% of the ultimate state of cure (theoretical cure) at a given temperature.

Flexographic Printing Precursors

The flexographic printing precursors of this invention are laser-engraveable to provide a desired relief image, and comprise at least one laser-engraveable layer that is formed from a laser-engraveable composition that comprises one or more EDPM elastomeric rubbers in a total amount of generally at least 30 weight % and up to and including 80 weight %, and more typically at least 40 weight % and up to and including 70 weight %, based on the total dry laser-engraveable composition.

Of the total elastomeric rubbers, the laser-engraveable composition comprises at least 10 parts (phr) and up to and including 100 parts (phr), and typically at least 30 parts (phr) and up to and including 80 parts (phr), of one or more CLCB EPDM elastomeric rubbers, based on the parts per hundred of the total weight of elastomeric rubbers (phr). In some of these embodiments, when the amount of CLCB EPDM elastomeric rubbers is less than 100 phr, the remainder of the elastomeric rubbers comprises one or more non-CLCB EPDM elastomeric rubbers (defined below). In addition to the CLCB EPDM and non-CLCB EPDM elastomeric rubbers, the laser-engraveable composition or layer can comprise one or more resins that are not EPDM elastomeric rubbers (secondary resins described below).

As described generally above, CLCB EPDM elastomeric rubbers are EPDM elastomeric rubbers that have controlled long-chain branching attached to the EPDM backbone. The molecular weight distribution for these polymers are considered to be narrow and have improved physical properties over EPDM elastomeric rubbers having a broader molecular weight distribution. Some of these elastomeric rubbers are commercially available from DSM Elastomers under the product names of Keltan® 8340A, 2340A, and 7341A. Some details of such EPDM elastomeric rubbers are also provided in a paper presented by Odenhamn to the RubberTech China Conference 1998. In general, the CLCB EPDM elastomeric rubbers are prepared from controlled side reactions during the polymerization of the ethylene, propylene, and diene terpolymers in the presence of third generation Zeigler Natta catalysts.

The amount of long-chain branching can be evaluated by using a dynamic mechanical spectrometer and is expressed in terms of a $\Delta(\delta)$ value that is a measure of the non-Newtonian viscoelastic behavior of an EPDM elastomeric rubber (for example using RPA 2000 analysis). The $\Delta\delta$ value is defined as the difference between the phase angle ($\delta$) at $10^{-1}$ rad/s and the phase angle ($\delta$) at $10^2$ rad/s, as derived from frequency sweep plots obtain using the dynamic mechanical spectrometry. The $\Delta(\delta)$ value decreases with an increasing degree of branching. The presence of branched EPDM molecules will increase the ($\delta$) specifically at low frequencies due to extensive polymer entanglement. The ($\delta$) value at high frequencies is governed by the average molecular weight of the EPDM elastomeric rubber. The CLCB EPDM elastomeric rubbers may also be identifiable by its Mooney relaxation slope (using MV200E) that requires some knowledge of the elastomeric resin and the equipment used in the analysis.

The amount of branching in the CLCB EPDM elastomeric rubbers can be designed to optimize processing behavior without undesirably changing physical properties. The presence of controlled branching in the CLCB EPDM elastomeric rubbers eliminates the need for high levels of unsaturation in the molecules. While branching in the EPDM elastomeric rubber is desired, it can be optimal to include some non-CLCB elastomeric rubbers in the laser-engraveable composition and layer so that processing properties (that is, formation of layers) is optimized from desired molecule packing. The EPDM elastomeric rubber molecules should fit well with each other and thus if there is too much branching, there can be excessive entanglements that inhibit desired packing properties. Some further details about the effects of branching in various elastomeric polymers are provided by Jahani et al., *Iranian Polymer Journal* 14(8), 2005, 693-704, and by Meijers et al., *Elastomers and Plastics* (KGK Kautschuk Gummi Kunststoffe), 52, Jahrgang, Nr. 10/99, 663-669, both of which are incorporate herein by reference.

Thus, the CLCB EPDM elastomeric rubbers are the most essential components of the laser-engraveable compositions and flexographic printing precursors of this invention, along with components a) and b) defined herein. Some flexographic printing precursors comprise a laser-engraveable layer that have laser-engraveable compositions that consist essentially of the CLCB EPDM elastomeric rubbers, while still other flexographic printing precursors comprise a laser-engraveable layer that consists only of one or more CLCB EPDM elastomeric rubbers.

However, in other embodiments, the CLCB EPDM elastomeric rubbers are used in combination with one or more non-CLCB EPDM elastomeric rubbers, for example wherein the weight ratio of the one or more CLCB EPDM elastomeric rubbers to the one or more non-CLCB elastomeric rubbers is from 1:3 to 5:1, or more typically of at least 1:1 and up to and including 3:1. For example, one or more "high molecular weight" non-CLCB EPDM elastomeric rubbers can be included in the laser-engraveable composition, and these compounds can be obtained from a number of commercial sources as the following products: Keltan® EPDM (from DSM Elastomers), Royalene® EPDM (from Lion Copolymers), Kep® (from Kumho Polychem), Nordel (from DuPont Dow Elastomers). Such high molecular weight non-CLCB EPDM elastomeric rubbers generally have a number average molecular weight of at least 20,000 and up to and including 800,000 and typically of at least 200,000 and up to and including 800,000, and more typically of at least 250,000 and up to and including 500,000. When present, the one or more high molecular weight non-CLCB EPDM elastomeric rubbers are generally present in the laser-engraveable composition in an amount of at least 20 phr and up to and including 80 phr, or typically in an amount of at least 40 phr and up to and including 60 phr.

In addition to, or in place of, the high molecular weight non-CLCB EPDM elastomeric rubber, the laser-engraveable composition or layer can further comprise one or more "low molecular weight" non-CLCB EPDM elastomeric rubbers that are generally in liquid form and have a number average molecular weight of at least 2,000 and up to but less than 20,000, and typically of at least 2,000 and up to and including 10,000, and more typically of at least 2,000 and up to and including 8,000. Such low molecular weight non-CLCB EPDM elastomeric rubbers can also be obtained from various commercial sources, for example as Trilene® EPDM (from Lion Copolymers). When present, the low molecular weight non-CLCB EPDM elastomeric rubbers are generally present in the laser-engraveable layer in an amount of at least 5 phr and up to and including 50 phr, or typically in an amount of at least 15 phr and up to and including 35 phr.

In some embodiments of this invention, the laser-engraveable composition or layer comprises: (a) at least one high molecular weight non-CLCB EPDM elastomeric rubber that has a molecular weight of at least 20,000, (b) at least one low molecular weight non-CLCB EPDM elastomeric rubber that has a molecular weight of at least 2,000 and less than 20,000, or (c) a mixture of one or more high molecular weight non-CLCB EPDM elastomeric rubbers each having a molecular weight of at least 20,000 and one or more of the low molecular weight non-CLCB EPDM elastomeric rubbers having a molecular weight of at least 2,000 and less than 20,000, at a weight ratio of high molecule weight non-CLCB EPDM elastomeric rubber to the low molecular weight non-CLCB EPDM elastomeric rubber of from 1:2.5 to 16:1, or typically from 1:1 to 4:1.

Still other non-CLCB EPDM elastomeric rubbers can be useful in the laser-engraveable composition or layer, which non-CLCB EPDM elastomeric rubbers can be considered as semi-crystalline or crystalline, the latter of which were found to be particularly useful when they have a number average molecular weight of at least 15,000 and up to and including 25,000. These non-CLCB EPDM elastomeric rubbers can be in solid, semi-solid, or liquid form and can have different amounts of ethylene groups.

Thus, in some embodiments of this invention, the flexographic printing precursor is formed from a laser-engraveable composition that comprises one or more non-CLCB EPDM elastomeric rubbers and at least 15 phr and up to and including 70 phr of one or more CLCB EPDM elastomeric rubbers. In such embodiments, the weight ratio of the one or more CLCB EPDM elastomeric rubbers to the one or more non-CLCB EPDM elastomeric rubbers can be from 1:3 to 5:1, or typically at least 1:1 and up to and including 3:1.

The laser-engraveable composition can optionally include minor amounts (less than 40 phr) of "secondary" resins that are non-EPDM elastomeric rubbers, for example to provide layer structure or reinforcement. These optional resins can include but are not limited to, thermosetting or thermoplastic urethane resins that are derived from the reaction of a polyol (such as polymeric diol or triol) with a polyisocyanate or the reaction of a polyamine with a polyisocyanate, copolymers of styrene and butadiene, copolymers of isoprene and styrene, styrene-butadiene-styrene block copolymers, styrene-isoprene-styrene copolymers, other polybutadiene or polyisoprene elastomers, nitrile elastomers, polychloroprene, polyisobutylene and other butyl elastomers, any elastomers containing chlorosulfonated polyethylene, polysulfide, poly-alkylene oxides, or polyphosphazenes, elastomeric polymers of (meth)acrylates, elastomeric polyesters, and other similar polymers known in the art.

Still other useful secondary non-EPDM resins include vulcanized rubbers, such as Nitrile (Buna-N), Natural rubber, Neoprene or chloroprene rubber, silicone rubber, fluorocarbon rubber, fluorosilicone rubber, SBR (styrene-butadiene rubber), NBR (acrylonitrile-butadiene rubber), ethylene-propylene rubber, and butyl rubber. Other useful secondary non-EPDM resins include but are not limited to, poly(cyanoacrylate)s that include recurring units derived from at least one alkyl-2-cyanoacrylate monomer and that forms such monomer as the predominant low molecular weight product during laser-engraving. These polymers can be homopolymers of a single cyanoacrylate monomer or copolymers derived from one or more different cyanoacrylate monomers, and optionally other ethylenically unsaturated polymerizable monomers such as (meth)acrylate, (meth)acrylamides, vinyl ethers, butadienes, (meth)acrylic acid, vinyl pyridine, vinyl phosphonic acid, vinyl sulfonic acid, and styrene and styrene derivatives (such as α-methylstyrene), as long as the non-cyanoacrylate comonomers do not inhibit the ablation process. The monomers used to provide these polymers can be alkyl cyanoacrylates, alkoxy cyanoacrylates, and alkoxyalkyl cyanoacrylates. Representative examples of poly(cyanoacrylates) include but are not limited to poly(alkyl cyanoacrylates) and poly(alkoxyalkyl cyanoacrylates) such as poly(methyl-2-cyanoacrylate), poly(ethyl-2-cyanoacrylate), poly(methoxyethyl-2-cyanoacrylate), poly(ethoxyethyl-2-cyanoacylate), poly(methyl-2-cyanoacrylate-co-ethyl-2-cyanoacrylate), and other polymers described in U.S. Pat. No. 5,998,088 (Robello et al.).

Yet other secondary non-EPDM resins are alkyl-substituted polycarbonate or polycarbonate block copolymers that form a cyclic alkylene carbonate as the predominant low molecular weight product during depolymerization from ablation. The polycarbonates can be amorphous or crystalline as described for example in Cols. 9-12 of U.S. Pat. No. 5,156,938 (Foley et al.).

It is possible to introduce a mineral oil into the laser-engraveable composition or layer formulation. One or more mineral oils can be present in an amount of at least 5 phr and up to and including 50 phr, but the mineral oil can be omitted if one or more low molecular weight EPDM elastomeric rubbers are present in an amount of at least 5 phr and up to and including 40 phr.

In most embodiments, the laser-engraveable composition comprises one or more UV, visible light, near-IR, or IR radiation absorbers that facilitate or enhance laser engraving to form a relief image. While any radiation absorber that absorbs a given wavelength of engraving energy can be used, in most embodiments, the radiation absorbers have maximum absorption at a wavelength of at least 700 nm and at greater wavelengths in what is known as the infrared portion of the electromagnetic spectrum. In particularly useful embodiments, the radiation absorber is a near-infrared radiation absorber having a $\lambda_{max}$ in the near-infrared portion of the electromagnetic spectrum, that is, having a $\lambda_{max}$ of at least 700 nm and up to and including 1400 nm or at least 750 nm and up to and including 1250 nm, or more typically of at least 800 nm and up to and including 1250 nm. If multiple engraving means having different engraving wavelengths are used, multiple radiation absorbers can be used, including a plurality of near-infrared radiation absorbers.

Particularly useful near-infrared radiation absorbers are responsive to exposure from near-IR lasers. Mixtures of the same or different types of near-infrared radiation absorbers can be used if desired. A wide range of useful near-infrared radiation absorbers include but are not limited to, carbon blacks and other near-IR radiation absorbing organic or inorganic pigments (including squarylium, cyanine, merocyanine, indolizine, pyrylium, metal phthalocyanines, and metal dithiolene pigments), and metal oxides.

Examples of useful carbon blacks include RAVEN® 450, RAVEN® 760 ULTRA®, RAVEN® 890, RAVEN® 1020, RAVEN® 1250 and others that are available from Columbian Chemicals Co. (Atlanta, Ga.) as well as N 293, N 330, N 375, and N 772 that are available from Evonik Industries AG (Switzerland) and Mogul® L, Mogul® E, Emperor 2000, and Regal® 330, and 400, that are available from Cabot Corporation (Boston Mass.). Both non-conductive and conductive carbon blacks (described below) are useful. Some conductive carbon blacks have a high surface area and a dibutyl phthalate (DBP) absorption value of at least 150 ml/100 g, as described for example in U.S. Pat. No. 7,223,524 (Hiller et al.) and measured using ASTM D2414-82 DBP Absorption of Carbon Blacks. Carbon blacks can be acidic or basic in nature. Useful conductive carbon blacks also can be obtained commercially as Ensaco™ 150 P (from Timcal Graphite and Carbon), Hi Black 160 B (from Korean Carbon Black Co. Ltd.), and also include those described in U.S. Pat. No. 7,223,524 (noted above, Col. 4, lines 60-62) that is incorporated herein by reference. Useful carbon blacks also include those that are surface-functionalized with solubilizing groups, and carbon blacks that are grafted to hydrophilic, nonionic polymers, such as FX-GE-003 (manufactured by Nippon Shokubai).

Other useful near-infrared radiation absorbing pigments include, but are not limited to, Heliogen Green, Nigrosine Base, iron (III) oxides, transparent iron oxides, magnetic pigments, manganese oxide, Prussian Blue, and Paris Blue. Other useful near-infrared radiation absorbers include carbon nanotubes, such as single- and multi-walled carbon nanotubes, graphite (including porous graphite), graphene, and carbon fibers.

A fine dispersion of very small particles of pigmented near-IR radiation absorbers can provide an optimum laser-engraving resolution and ablation efficiency. Suitable pigment particles are those with diameters less than 1 µm.

Dispersants and surface functional ligands can be used to improve the quality of the carbon black, metal oxide, or pigment dispersion so that the near-IR radiation absorber is uniformly incorporated throughout the laser-engraveable layer.

In general, one or more radiation absorbers, such as near-infrared radiation absorbers, are present in the laser-engraveable composition in a total amount of at least total amount of at least 2 phr and up to and including 90 phr and typically from at least 3 phr and up to and including 30 phr. Alternatively, the near-infrared radiation absorber includes one or more conductive or non-conductive carbon blacks, graphene, graphite, carbon fibers, or carbon nanotubes, and especially carbon nanotubes, carbon fibers, or a conductive carbon black having a dibutyl phthalate (DBP) absorption value of less than 110 ml/100 g, in an amount of at least 3 phr, or at least 5 phr and up to and including 30 phr.

It is also possible that the near-infrared radiation absorber (such as a carbon black) is not dispersed uniformly within the laser-engraveable layer, but it is present in a concentration that is greater near the bottom surface of the laser-engraveable layer than the top surface. This concentration profile can provide a laser energy absorption profile as the depth into the laser-engraveable layer increases. In some instances, the concentration changes continuously and generally uniformly with depth. In other instances, the concentration is varied with layer depth in a step-wise manner. Further details of such arrangements of the near-IR radiation absorbing compound are provided in U.S. Patent Application Publication 2011/0089609 (Landry-Coltrain et al.) that is incorporated herein by reference.

In some particularly useful embodiments, the laser-engraveable composition comprises component a) described above that comprises at least 2 phr and up to and including 30 phr, and typically at least 3 phr and up to and including 30 phr, of one or more near-infrared radiation absorbers (such as a carbon black, carbon nanotubes, carbon fibers, graphite, or graphite), and at least 1 phr and up to and including 80 phr, and typically at least 1 phr and up to and up to and including 60 phr, of one or more non-infrared radiation absorber fillers. While polymeric (organic) non-infrared radiation absorber fillers are possible, it is more likely that the non-infrared radiation absorber fillers are predominantly or all inorganic in nature.

Useful inorganic non-infrared radiation absorber fillers include but not limited to, various silicas (treated, fumed, or untreated), calcium carbonate, magnesium oxide, talc, barium sulfate, kaolin, bentonite, zinc oxide, mica, titanium dioxide, and mixtures thereof. Particularly useful inorganic non-infrared radiation absorbing fillers are silica, calcium carbonate, and alumina, such as fine particulate silica, fumed silica, porous silica, surface treated silica, sold as Aerosil® from Degussa, Utrasil® from Evonik, and Cab-O-Sil® from Cabot Corporation, micropowders such as amorphous magnesium silicate cosmetic microspheres sold by Cabot and 3M Corporation, calcium carbonate and barium sulfate particles and microparticles, zinc oxide, and titanium dioxide, or mixtures of two or more of these materials.

The amount of the non-infrared radiation absorber fillers in the laser-engraveable composition is generally at least 1 phr and up to and including 80 phr, or typically at least 1 phr and up to and including 60 phr. Coupling agents can be added for connection between fillers and all of the polymers in the laser-engraveable layer. An example of a coupling agent is silane (Dynsylan 6498 or Si 69 available from Evonik Degussa Corporation).

Contrary to the teaching in the prior art (for example, "Laser Engraving of Rubbers—The Influence of Fillers" by W. Kern et al., October 1997, 710-715, Rohstoffe Und Anwendendunghen) describing various EPDM elastomeric rubber formulations, it has been found that the use of the inorganic non-infrared radiation absorber inorganic fillers does not adversely affect laser-engraveability or sensitivity. Actually, the use of such materials in the practice of this invention can improve the mechanical properties of the flexographic printing precursor.

When the near-infrared radiation absorber, such as a carbon black, is used with the inorganic non-infrared radiation absorber filler as described for component a), the weight ratio of the near-infrared radiation absorber to the non-infrared radiation absorber filler is from 1:40 to 30:1 or typically from 1:30 to 20:1, or more typically from 1:20 to 10:1. When these weight ratios are used, the result is a laser-engraveable layer hardness that provides excellent printing quality, low compression set that provides a resistance to changes in the flexographic printing member after impact during each printing impression, and improved imaging speed.

In some embodiments, the flexographic printing precursor comprises a laser-engraveable composition comprising one or more non-infrared radiation absorber fillers, a near-infrared radiation absorber (such as a carbon black), and a mixture one or more CLCB EPDM elastomeric rubbers in an amount of at least 15 phr and up to and including 70 phr and one or more non-CLCB EPDM elastomeric rubbers, wherein the weight ratio of the one or more CLCB elastomeric rubbers to the one or more non-CLCB EPDM rubbers is from 1:3 to 5:1.

Still other embodiments of this invention include flexographic printing precursors that comprise a laser-engraveable layer formed from a laser-engraveable composition comprising:

at least 1 phr and up to and including 80 phr of one or more non-infrared radiation absorbing fillers and at least 2 phr and up to and including 30 phr of a carbon black, wherein the weight ratio of the carbon black to one or more non-infrared radiation absorber fillers is from at least 1:40 and up to and including 30:1, and the laser-engraveable composition further comprises a mixture one or more CLCB EPDM elastomeric rubbers and one or more non-CLCB EPDM elastomeric rubbers, wherein the weight ratio of one or more CLCB EPDM elastomeric rubbers to the one or more non-CLCB EPDM elastomeric rubbers is from 1:3 to 5:1.

Some useful embodiments of laser-engraveable compositions and layers comprise a conductive or non-conductive carbon black, carbon fibers, or carbon nanotubes as the near-infrared radiation absorber, and both components a) and b) described above wherein component a) comprises silica, calcium carbonate, or both silica and calcium carbonate particles as the non-infrared radiation absorber filler.

It is also desirable that the laser-engraveable composition include component b) described above that comprises at least 2 phr and up to and including 30 phr or typically at least 2 phr and up to and including 20 phr of a near-infrared radiation absorber, and at least 3 phr and up to and including 20 phr, or typically at least 7 phr and up to and including 12 phr, of a vulcanizing composition that comprises: (1) a sulfur composition, (2) a peroxide composition, or (3) a composition comprising a mixture of a sulfur composition and a peroxide composition, wherein the weight ratio of the near-infrared radiation absorber to the vulcanizing composition is from 1:10 to 10:1.

The vulcanizing composition (or crosslinking composition) can crosslink the CLCB and non-CLCB EPDM elastomeric rubbers and any other resin in the laser-engraveable composition that can benefit from crosslinking. The vulcanizing composition, including all of its essential components, is generally present in the laser-engraveable composition in an amount of at least 3 phr and up to and including 20 phr, or typically of at least 7 phr and up to and including 12 phr, especially when the vulcanizing composition comprises the mixture of first and second peroxides described herein.

Useful sulfur vulcanizing compositions comprise one or more sulfur and sulfur-containing compounds such as Premix sulfur (insoluble 65%), zinc dibutyl dithiocarbamate (ZDBC), 2-benzothiazolethiol (MBT), and tetraethylthiuram disulfide (TETD). Generally, the sulfur vulcanizing compositions also generally comprise one or more accelerators as additional components, including but not limited to tetramethylthiuram disulfide (TMTD), tetramethylthiuram monosulfide (TMTM), and 4,4'-dithiodimorpholine (DTDM) in a molar ratio of the sulfur or sulfur-containing compound to the accelerator of from 1:12 to 2.5:1. Thus, some useful sulfur vulcanizing compositions consist essentially of: (1) one or more of sulfur or a sulfur-containing compound, and (2) one or more accelerators. Other useful sulfur-containing compounds, accelerators (both primary and secondary compounds), and useful amounts of each are well known in the art.

Other useful vulcanizing compositions are peroxide vulcanizing compositions that comprise one or more peroxides including but not limited to, di(t-butylperoxyisopropyl)benzene, 2,5-dimethyl-2,5 bis(t-butyl) peroxy)hexane, dicumyl peroxide, di(t-butyl) peroxide, butyl 4,4'-di(t-butylperoxy) valerate, 1,1'-bis(t-butylperoxy)-3,3,5-trimethylcyclohexane, t-butyl cumyl peroxide, t-butyl peroxybenzoate, t-butyl peroxy-2-ethylhexyl carbonate, and any others that can react with single carbon-carbon bonds and thus produce a higher curing density. The term "peroxide" also includes "hydroperoxides". Many commercially available peroxides are supplied at 40-50% activity with the remainder of the commercial composition being inert silica or calcium carbonate particles. The peroxide vulcanizing compositions generally also comprise one or more co-reagents at a molar ratio to the total peroxides of from 1:6 to 25:1. Useful co-reagents include but are not limited to, triallyl cyanurate (TAC), triallyl isocyanurate, triallyl trimellitate, the esters of acrylic and methacrylic acids with polyvalent alcohols, trimethylprpane trimethacrylate (TMPTMA), trimethylolpropane triacrylate (TMPTA), ethylene glycol dimethacrylate (EGDMA), and N,N'-m-phenylenedimaleimide (HVA-2, DuPont) to enhance the liberation of free radicals from the peroxides. Some useful peroxide compositions consist essentially of: (1) one or more peroxides, and particularly mixtures of first and second peroxides described below, and (2) one or more co-reagents. Other useful peroxides and co-reagents (such as Type I and Type II compounds) are well known in the art.

It is particularly useful to use a mixture of at least first and second peroxides in a peroxide vulcanizing composition, wherein the first peroxide has a $t_{90}$ value of at least 1 minute and up to and including 6 minutes, typically at least 2 minutes and up to and including 6 minutes, as measured at 160° C., and the second peroxide has a $t_{90}$ value of at least 8 minutes and up to and including 20 minutes, or typically at least 10 minutes and up to and including 20 minutes, as measured at 160° C. Useful examples of the first peroxides include but are not limited to, t-butyl peroxybenzoate, 1,1'-bis(t-butylperoxy)-3,3,5-trimethylcyclohexane, t-butylperoxy 2-ethylhexyl carbonate, and butyl 4,4'-di(t-butylperoxy)valerate. Useful examples of the second peroxides include but are not limited to, di(t-butylperoxyisopropyl)benzene, dicumyl peroxide, t-butyl cumyl peroxide, and 2,5-dimethyl-2,5 bis(t-butyl)peroxy)hexane. Other representative first and second peroxides could be easily determined by consulting known information about the $t_{90}$ values for various peroxides.

The molar ratio of the first peroxide to the second peroxide is generally at least 1:4 and up to and including 5:1, or typically at least 1:1.5 and up to and including 3:1.

These mixtures of first and second peroxides can also comprise one or more co-reagents as described above. In some embodiments, useful peroxide vulcanizing compositions consist essentially of: (1) one or more first peroxides, (2) one or more second peroxides, and (3) one or more co-reagents.

The mixtures comprising at least one first peroxide and at least one second peroxide can further comprise additional peroxides as long as the laser-engraveable composition has the desired characteristics described herein. For example, it is particularly useful that the laser-engraveable composition exhibit a $t_{90}$ value of at least 1 minute and up to and including 17 minutes at 160° C.

Still other useful vulcanizing compositions comprise at least one of sulfur or a sulfur-containing compound (with or without an accelerator), and at least one peroxide (with or without a co-reagent). Thus, some of these vulcanizing compositions comprise: (1) sulfur or a sulfur-containing compound, (2) a first peroxide, (3) a second peroxide, (4) one or more accelerators, and (5) one or more co-reagents, all as described above. Still other useful vulcanizing compositions consist essentially of (1) a sulfur or a sulfur-containing compound, (2) one or more accelerators, (3) one or more peroxides (such as a mixture of a first and second peroxides), and (4) one or more co-reagents, all as described above.

In many embodiments of this invention, the laser-engraveable composition comprises the b) component described above and the near-infrared radiation absorber is a carbon black (conductive or non-conductive). When a peroxide vulcanizing composition is used comprising first and second peroxides (as described above with the noted ranges of $t_{90}$ values at 160° C.), the near-infrared radiation absorber can also be a conductive or non-conductive carbon black wherein the weight ratio of the carbon black to the mixture of at least first and second peroxides is from 1:17 to 10:1. These weight ratios do not include the co-reagents that are also likely to be present in the peroxide vulcanizing composition.

The laser-engraveable composition or layer can further comprise microcapsules that are dispersed generally uniformly within the laser-engraveable composition. These "microcapsules" can also be known as "hollow beads", "hollow spheres", "microspheres", "microbubbles", "micro-balloons", "porous beads", or "porous particles". Some microcapsules include a thermoplastic polymeric outer shell and a core of either air or a volatile liquid such as isopentane or isobutane. The microcapsules can comprise a single center core or many voids (pores) within the core. The voids can be interconnected or non-connected. For example, non-laser-ablatable microcapsules can be designed like those described in U.S. Pat. Nos. 4,060,032 (Evans) and 6,989,220 (Kanga) in which the shell is composed of a poly[vinylidene-(meth)acrylonitrile] resin or poly(vinylidene chloride), or as plastic micro-balloons as described for example in U.S. Pat. Nos. 6,090,529 (Gelbart) and 6,159,659 (Gelbart). The amount of microspheres present in the laser-engraveable composition or layer can be at least 1 phr and up to and including 15 phr. Some useful microcapsules are the EXPANCEL microspheres that are commercially available from Akzo Noble Industries (Duluth, Ga.), Dualite and Micropearl polymeric microspheres that are available from Pierce & Stevens Corporation (Buffalo, N.Y.), hollow plastic pigments that are available from Dow Chemical Company (Midland, Mich.) and Rohm and Haas (Philadelphia, Pa.). The useful microcapsules generally have a diameter of 50 µm or less.

Upon laser-engraving, the microspheres that are hollow or filled with an inert solvent, burst and give a foam-like structure or facilitate ablation of material from the laser-engraveable layer because they reduce the energy needed for ablation.

Optional addenda in the laser-engraveable composition or layer can include but are not limited to, dyes, antioxidants, antiozonants, stabilizers, dispersing aids, surfactants, and adhesion promoters, as long as they do not interfere with laser-engraving efficiency.

The flexographic printing precursor of this invention generally has a laser-engraveable layer having a $\Delta$ torque ($M_\Delta = M_H - M_L$) of at least 10 and up to and including 25, or typically of at least 13 and up to and including 22, wherein the components of this equation are defined above.

The laser-engraveable layer incorporated into the flexographic printing precursors of this invention has a dry thickness of at least 50 µm and up to and including 4,000 µm, or typically of at least 200 µm and up to and including 2,000 µm.

The flexographic printing precursors of this invention can comprise one or more layers. Thus, the precursors can comprise multiple layers, at least one of which is the laser-engraveable layer in which the relief image is formed. There can be a non-laser-engraveable elastomeric rubber layer (for example, a cushioning layer) between a substrate and the laser-engraveable layer.

While a single laser-engraveable layer is present in most flexographic printing precursors, there can be multiple laser-engraveable layers formed from the same or different laser-engraveable compositions, that is, having the same or different EPDM elastomeric rubbers and amounts as long as the uppermost laser-engraveable layer comprises CLCB EPDM elastomeric rubbers of the composition and amounts described above (at least 30 weight % and up to and including 80 weight %).

In most embodiments, the laser-engraveable layer is the outermost layer of the flexographic printing precursors, including embodiments where the laser-engraveable layer is disposed on a printing cylinder as a sleeve. However, in some embodiments, the laser-engraveable layer can be located underneath an outermost capping smoothing layer that provides additional smoothness or better ink reception and release. This smoothing layer can have a general thickness of at least 1 μm and up to and including 200 μm.

The flexographic printing precursors of this invention can comprise a self-supporting laser-engraveable layer (defined above) that does not need a separate substrate to provide physical integrity and strength. In such embodiments, the laser-engraveable layer is thick enough and laser engraving is controlled in such a manner that the relief image depth is less than the entire thickness, for example at least 20% and up to and including 80% of the entire dry layer thickness.

However, in other embodiments, the flexographic printing precursor of this invention has a suitable dimensionally stable, non-laser-engraveable substrate having an imaging side and a non-imaging side. The substrate has at least one laser-engraveable layer disposed on the imaging side. Suitable substrates include dimensionally stable polymeric films, aluminum sheets or cylinders, transparent foams, ceramics, fabrics, or laminates of polymeric films (from condensation or addition polymers) and metal sheets such as a laminate of a polyester and aluminum sheet or polyester/polyamide laminates, or a laminate of a polyester film and a compliant or adhesive support. Polyester, polycarbonate, polyvinyl, and polystyrene films are typically used. Useful polyesters include but are not limited to poly(ethylene terephthalate) and poly(ethylene naphthalate). The substrates can have any suitable thickness, but generally they are at least 0.01 mm or at least 0.05 mm and up to and including 0.5 mm thick. An adhesive layer can be used to secure the laser-engraveable layer to the substrate.

Some particularly useful substrates comprise one or more layers of a metal, fabric, or polymeric film, or a combination thereof. For example, a fabric web can be applied to a polyester or aluminum support using a suitable adhesive. For example, the fabric web can have a thickness of at least 0.1 mm and up to and including 0.5 mm, and the polyester support thickness can be at least 100 μm and up to and including 200 μm, or the aluminum support can have a thickness of at least 200 μm and up to and including 400 μm. The dry adhesive thickness can be at least 10 μm and up to and including 80 μm.

There can be a non-laser-engraveable backcoat on the non-imaging side of the substrate (if present) that can comprise a soft rubber or foam, or other compliant layer. This non-laser-engraveable backcoat can provide adhesion between the substrate and printing press rollers and can provide extra compliance to the resulting flexographic printing member, or for example to reduce or control the curl of a resulting flexographic printing plate.

Preparation of Flexographic Printing Precursors

The flexographic printing precursors of this invention can be prepared in the following manner:

A mixture of one or more EPDM elastomeric rubbers including at least one CLCB EPDM elastomeric rubber can be formulated with desired weight ratios. This mixture can also be formulated to include one or more high molecular weight EPDM elastomeric rubbers, one or more low molecular weight EPDM elastomeric rubbers, or both a high molecular weight EPDM elastomeric rubber and a low molecular weight EPDM elastomeric rubbers, all at desired weight amounts (based on phr). Additional components (such as the non-radiation absorber fillers or near-infrared radiation absorbers, but not the vulcanizing compositions) can be added and the resulting mixture is then compounded using standard equipment for rubber processing (for example, a 2-roll mill or internal mixer of the Banbury type). During this mixing process, the temperature of the formulation can rise to 110° C. due to the high shear forces in the mixing apparatus. Mixing (or formulating) generally would require at least 5 and up to and including 30 minutes depending upon the formulation batch size, amount of non-radiation absorber fillers, types and amounts of the various elastomeric rubbers, the amount of any non-elastomeric resins, and other factors known to a skilled artisan.

The vulcanizing composition can then be added to standard equipment and the temperature of the formulation is kept below 70° C. so vulcanizing will not begin prematurely.

The compounded formulation can be strained to remove undesirable extraneous matter and then fed into a calender to deposit or apply a continuous sheet of the "rubber" formulation onto a carrier base (such as a fabric web) and wound into a continuous roll of a dry laser-engraveable layer on the fabric base.

Controlling the laser-engraveable layer (sheet) thickness is accomplished by adjusting the pressure between the calender rolls and the calendering speed. In some cases, where the laser-engraveable formulation does not stick to the calender rollers, the rollers are heated to improve the tackiness of the formulation and to provide some adhesion to the calender rollers. This continuous roll of calendered material can be vulcanized using a "rotacure" system under desired temperature and pressure conditions. For example, the temperature can be at least 150° C. and up to and including 180° C. over a period of at least 2 and up to and including 15 minutes. For example, using a sulfur vulcanizing composition, the curing conditions are generally about 165° C. for about 15 minutes. Shorter curing times can be used if higher than atmospheric pressure is used. For vulcanizing peroxide compositions, for example comprising the peroxide product Perkadox® 14/40 (Kayaku Akzo), the curing conditions would can be about 165° C. for about 4 minutes followed by a post-curing stage at a temperature of 240° C. for 120 minutes.

The continuous laser-engraveable layer (for example, on a fabric web) can then be laminated (or adhered) to a suitable polymeric film such as a polyester film to provide the laser-engraveable layer on a substrate, for example, the fabric web adhered with an adhesive to the polyester film. The continuous laser-engraveable layer can be ground using suitable grinding apparatus to provide a uniform smoothness and thickness in the continuous laser-engraveable layer. The smooth, uniformly thick laser-engraveable layer can then be cut to a desired size to provide suitable flexographic printing plate precursors of this invention.

The process for making flexographic printing sleeves is similar but the compounded laser-engraveable layer formulation can be applied or deposited around a printing sleeve core and processed to form a continuous laser-engraveable flexographic printing sleeve precursor that is then vulcanized in a suitable manner and ground to a uniform thickness using suitable grinding equipment.

Similarly, a continuous calendered laser-engraveable layer on a fabric web can be deposited around a printing cylinder and processed to form a continuous flexographic printing cylinder precursor.

The flexographic printing precursor can also be constructed with a suitable protective layer or slip film (with release properties or a release agent) in a cover sheet that is removed prior to laser-engraving. The protective layer can be a polyester film [such as poly(ethylene terephthalate)] forming the cover sheet.

A method for providing a flexographic printing plate precursor can comprise:

compounding an elastomeric composition comprising a CLCB EPDM elastomeric rubber and a optionally one or more non-CLCB EPDM elastomeric rubbers, wherein the CLCB EPDM elastomeric rubber is present in an amount of at least 10 phr and up to and including 100 phr based on parts per hundred of the total weight of elastomeric rubbers (phr) to provide a compounded elastomeric rubber composition (or formulation), the compounded elastomeric rubber composition optionally further comprising one or more of the following components:

a near-infrared radiation absorber, a vulcanizing composition that is selected from the group consisting of sulfur composition, a peroxide composition, and a mixture of a sulfur composition and a peroxide composition, one or more inorganic non-infrared radiation absorbing fillers, and one or more non-EPDM resins, applying the compounded elastomeric rubber composition to a substrate, vulcanizing the compounded elastomeric rubber composition on the substrate to provide a laser-engraveable layer in a flexographic printing precursor.

Moreover, this method can also comprise applying the compounded elastomeric rubber composition to a fabric web before vulcanizing, and adhering the fabric web having the vulcanized, compounded elastomeric rubber composition to a suitable substrate, such as a polymer film or metal sheet.

In addition, the fabric web can be provided as a continuous web and the substrate can be a polyester web so that the resulting flexographic printing precursor is in the form of a continuous precursor web. The fabric web can be adhered to the polyester web using a suitable adhesive.

The method can further comprise calibrating (for example, grinding) the laser-engraveable layer of the flexographic printing precursor to a desired uniform thickness, for example, using a suitable grinding process and apparatus.

As noted above, the compounded elastomeric rubber composition can comprise a near-infrared radiation absorber such as a carbon black, a vulcanizing composition (such as the mixture of first and second peroxides), and one or more non-infrared radiation absorber fillers.

Thus, the method can be used to provide a flexographic printing plate precursor, or the substrate is a printing sleeve core and the method provides a flexographic printing sleeve precursor.

Laser-Engraving Imaging to Prepare Flexographic Printing Members, and Flexographic Printing Laser engraving can be accomplished using a near-IR radiation emitting diode or carbon dioxide or Nd:YAG laser. It is desired to laser engrave the laser-engraveable layer to provide a relief image with a minimum dry depth of at least 50 µm or typically of at least 100 µm. More likely, the minimum relief image depth is at least 300 µm and up to and including 4000 µm or up to 1000 µm being more desirable. Relief is defined as the difference measured between the floor of the imaged flexographic printing member and its outermost print surface. The relief image can have a maximum depth up to 100% of the original dry thickness of the laser-engraveable layer if it is disposed directly on a substrate or underlayer. In such instances, the floor of the relief image can be the substrate (if the laser-engraveable layer is completely removed in the imaged regions), a lower region of the laser-engraveable layer, or an underlayer such as an adhesive layer or compliant layer. When a substrate is absent, the relief image can have a maximum depth of up to 80% of the original dry thickness of the laser-engraveable layer. A semiconductor near-infrared radiation laser or array of such lasers operating at a wavelength of at least 700 nm and up to and including 1400 nm can be used, and a diode laser operating at from 800 nm to 1250 nm is particularly useful for laser-engraving.

Generally, laser-engraving is achieved using at least one near-infrared radiation laser having a minimum fluence level of at least 20 $J/cm^2$ at the imaged surface and typically near-infrared imaging fluence is at least 20 $J/cm^2$ and up to and including 1,000 $J/cm^2$ or typically at least 50 $J/cm^2$ and up to and including 800 $J/cm^2$.

A suitable laser engraver that would provide satisfactory engraving is described in WO 2007/149208 (Eyal et al.) that is incorporated herein by reference. This laser engraver is considered to be a "high powered" laser ablating imager or engraver and has at least two laser diodes emitting radiation in one or more near-infrared radiation wavelengths so that imaging with the one or more near-infrared radiation wavelengths is carried out at the same or different depths relative to the outer surface of the laser-engraveable layer. For example, the multi-beam optical head described in the noted publication incorporates numerous laser diodes, each laser diode having a power in the order of at least 10 Watts per emitter width of 100 µm. These lasers can be modulated directly at relatively high frequencies without the need for external modulators.

Thus, laser-engraving (laser imaging) can be carried out at the same or different relief image depths relative to the outer surface of the laser-engraveable layer using two or more laser diodes, each laser diode emitting near-infrared radiation in one or more wavelengths.

Other imaging (or engraving) devices and components thereof and methods are described for example in U.S. Patent Application Publications 2008/0153038 (Siman-Tov et al.) describing a hybrid optical head for direct engraving, 2008/0305436 (Shishkin) describing a method of imaging one or more graphical pieces in a flexographic printing plate precursor on a drum, 2009/0057268 (Aviel) describing imaging devices with at least two laser sources and mirrors or prisms put in front of the laser sources to alter the optical laser paths, and 2009/0101034 (Aviel) describing an apparatus for providing an uniform imaging surface, all of which publications are incorporated herein by reference. In addition, U.S. Patent Application Publication 2011/0014573 (Matzner et al.) describes an engraving system including an optical imaging head, a printing plate construction, and a source of imaging near-infrared radiation, which publication is incorporated herein by reference. U.S. Patent Application Publication 2011/0058010 (Aviel et al.) describes an imaging head for 3D imaging of flexographic printing plate precursors using multiple lasers, which publication is also incorporated herein by reference.

Thus, a system for providing flexographic printing members including flexographic printing plates, flexographic printing cylinders, and flexographic printing sleeves includes one or more of the flexographic printing precursors described above, as well as one or more groups of one or more sources of imaging (engraving) near-infrared radiation, each source capable of emitting near-infrared radiation (see references cited above) of the same or different wavelengths. Such imaging sources can include but are not limited to, laser diodes, multi-emitter laser diodes, laser bars, laser stacks, fiber lasers, and combinations thereof. The system can also include one or more sets of optical elements coupled to the sources of imaging (engraving) near-infrared radiation to direct imaging near-infrared radiation from the sources onto the flexographic printing precursor (see references cited above for examples of optical elements).

Engraving to form a relief image can occur in various contexts. For example, sheet-like elements can be imaged and used as desired, or wrapped around a printing sleeve core or cylinder form before imaging. The flexographic printing precursor can also be a flexographic printing sleeve precursor or flexographic printing cylinder precursor that can be imaged.

During imaging, products from the engraving can be gaseous or volatile and readily collected by vacuum for disposal or chemical treatment. Any solid debris from engraving can be collected and removed using suitable means such as vacuum, compressed air, brushing with brushes, rinsing with water, ultrasound, or any combination of these.

During printing, the resulting flexographic printing plate, flexographic printing cylinder, or printing sleeve is typically inked using known methods and the ink is appropriately transferred to a suitable substrate such as papers, plastics, fabrics, paperboard, metals, particle board, wall board, or cardboard.

After printing, the flexographic printing plate or sleeve can be cleaned and reused and a flexographic printing cylinder can be scraped or otherwise cleaned and reused as needed. Cleaning can be accomplished with compressed air, water, or a suitable aqueous solution, or by rubbing with cleaning brushes or pads.

Some additional embodiments include:

A method of preparing the flexographic printing plate precursor of this invention comprising:

providing a CLCB EPDM elastomer rubber, or a mixture of a non-CLCB EPDM elastomeric rubber and a CLCB EPDM elastomeric rubber, adding additional components (near-infrared radiation absorbers, vulcanizing compositions, inorganic non-infrared radiation absorber filler), and compounding to provide a compounded mixture using, for example, a two-roll mill, applying the compounded mixture to a web such as a continuous fabric web, to provide a continuous laser-engraveable layer, causing vulcanization in the continuous laser-engraveable layer, and laminating a polymer (such as a polyester) film to the continuous laser-engraveable layer to provide a continuous laminated flexographic laser-engraveable precursor.

This method can further comprise grinding the continuous laser-engraveable layer or the continuous laminated flexographic laser-engraveable precursor.

The compounded mixture of CLCB EPDM elastomeric rubber and non-CLCB EPDM elastomeric rubber can also comprise a carbon black or other near-infrared radiation absorber in an amount of at least 2 phr and up to and including 30 phr and the weight ratio of the of a CLCB EPDM elastomeric rubber and the non-CLCB elastomeric rubber is from 1:3 to 5:1.

Any of these method embodiments can utilize a compounded mixture of a CLCB EPDM elastomeric rubber and a non-CLCB EPDM elastomeric rubber, one or more inorganic non-infrared radiation absorber fillers, a vulcanizing composition as described above (sulfur composition, peroxide composition, or both compositions), or both an inorganic non-infrared radiation absorber filler and a vulcanizing composition.

In these methods, the continuous laminated web can further comprise a fabric layer between the polyester support and the continuous infrared radiation ablatable layer, and there can be an adhesive between the fabric layer and the polyester support.

In still other methods, a flexographic printing sleeve precursor can be prepared by:

providing a CLCB EPDM elastomeric rubber, or a mixture of a CLCB EPDM elastomeric rubber and a non-CLCB EPDM elastomeric rubber, adding additional components (near-infrared radiation absorbers, vulcanizing compositions, inorganic non-infrared radiation absorber filler), and compounding to provide a compounded mixture using, for example, a two-roll mill, applying the compounded mixture to a printing sleeve core to provide a continuous laser-engraveable layer on the sleeve core, causing vulcanization in the continuous laser-engraveable layer, and smoothing the continuous laser-engraveable layer, for example, by grinding, to a uniform thickness.

In this method for making a flexographic printing sleeve precursor, the compounded mixture of a CLCB EPDM elastomeric rubber and a non-CLCB EPDM elastomeric rubber can further comprise one or more inorganic non-infrared radiation absorber fillers, a vulcanizing composition as described above (sulfur composition, peroxide composition, or both compositions), or both an inorganic non-infrared radiation absorber filler and a vulcanizing composition.

A method of providing a flexographic printing plate or sleeve comprises:

imaging the flexographic printing precursor of this invention using near-infrared radiation to provide a relief image in the near-infrared radiation ablatable layer. This imaging can be carried out using a laser at a power of at least 20 J/cm$^2$. The method can further comprise removal of debris after imaging, such as for example, by vacuum, compressed air, brushes, rinsing with water, ultrasound, or any combination of these.

The imaging of this method can be carried out using a high power laser ablating imager, for example, wherein imaging is carried out at the same or different depths relative to the surface of the near-infrared radiation ablatable layer using two or more laser diodes each emitting radiation in one or more wavelengths.

The present invention also provides at least the following embodiments and combinations thereof, but other combinations of features are considered to be within the present invention as a skilled artisan would appreciate from the teaching of this disclosure:

1. A laser-engraveable composition comprising one or more elastomeric rubbers in an amount of at least 30 weight % and up to and including 80 weight %, based on the total laser-engravable composition weight, wherein the laser-engraveable composition further comprises at least 10 parts and up to and including 100 parts of one or more CLCB EPDM elastomeric rubbers, based on parts per hundred of the total weight of elastomeric rubbers (phr) in the laser-engraveable composition, the laser-engraveable composition further comprising one or both of the following components a) and b):

a) at least 2 phr and up to and including 30 phr of an infrared radiation absorber and at least 1 phr and up to and including 80 phr of an inorganic, non-infrared radiation absorber filler, wherein the weight ratio of the infrared radiation absorber to the inorganic, non-infrared radiation absorber filler is from 1:40 to 30:1, and b) at least 2 phr and up to and including 30 phr of a near-infrared radiation absorber, and at least 3 phr and up to and including 20 phr of a vulcanizing composition that comprises a mixture of at least first and second peroxides, wherein the first peroxide has a $t_{90}$ value of at least 1 minute and up to and including 6 minutes as measured at 160° C., and the second peroxide has a $t_{90}$ value of at least 8 minutes and up to and including 20 minutes as measured at 160° C., and wherein the weight ratio of the near-infrared radiation absorber to the vulcanizing composition is from 1:10 to 10:1.

2. The laser-engraveable composition of embodiment 1 comprising component a) wherein the weight ratio of the near-infrared radiation absorber to the inorganic, non-infrared radiation absorber filler if from 1:30 to 20:1.

3. The laser-engraveable composition of embodiment 1 or 2 comprising a carbon black and wherein the weight ratio of the carbon black to the mixture of at least first and second peroxides is from 1:5 to 5:1.

4. The laser-engraveable composition of any of embodiments 1 to 3 that exhibits a $t_{90}$ value of at least 1 minute and up to and including 17 minutes at 160° C.

5. The laser-engraveable composition of any of embodiments 1 to 4 further comprising one or more non-CLCB EPDM elastomeric rubbers.

6. The laser-engraveable composition of embodiment 5 wherein the laser-engraveable composition further comprises one or more non-CLCB EPDM elastomeric rubbers and the one or more CLCB EPDM elastomeric rubbers are present in an amount of at least 15 phr and up to and including 70 phr.

7. The laser-engraveable composition of embodiment 5 or 6 wherein the weight ratio of the one or more CLCB EPDM elastomeric rubbers to the one or more non-CLCB EPDM elastomeric rubbers is from 1:3 to 5:1.

8. The laser-engraveable composition of any of embodiments 5 to 7 wherein the weight ratio of the one or more CLCB EPDM elastomeric rubbers to the one or more non-CLCB EPDM elastomeric rubbers is from 1:1 to 3:1.

9. The laser-engraveable composition of any of embodiments 1 to 8 comprising:

a) a high molecular weight non-CLCB EPDM elastomeric rubber that has a molecular weight of at least 20,000, b) a low molecular weight non-CLCB EPDM elastomeric rubber that has a molecular weight of at least 2,000 and less than 20,000, or c) a mixture of a high molecular weight non-CLCB EPDM elastomeric rubber and a low molecular weight non-CLCB EPDM elastomeric rubber at a weight ratio of the high molecular weight non-CLCB EPDM elastomeric rubber to the low molecular weight non-CLCB EPDM elastomeric rubber of from 1:1 to 4:1.

10. The laser-engraveable composition of any of embodiments 1 to 9 comprising a conductive or non-conductive carbon black, graphene, graphite, carbon fibers, or carbon nanotubes as the near-infrared radiation absorber.

11. The laser-engraveable composition of any of embodiments 1 to 10 comprising a conductive or non-conductive carbon black, graphene, graphite, carbon fibers, or carbon nanotubes as the near-infrared radiation absorber in an amount of at least 5 phr and up to and including 30 phr.

12. The laser-engraveable composition of any of embodiments 1 to 11 comprising carbon nanotubes, carbon fibers, or a conductive carbon black having a dibutyl phthalate (DBP) absorption value of at least 110 ml/100 g, wherein the carbon nanotubes, carbon fibers, or conductive carbon black is present in an amount of at least 3 phr and up to and including 30 phr.

13. The laser-engraveable composition of any of embodiments 1 to 12 comprising a conductive or non-conductive carbon black, carbon fibers, or carbon nanotubes as the infrared radiation absorber, and component b).

14. The laser-engraveable composition of any of embodiments 1 to 13 comprising a conductive or non-conductive carbon black, carbon fibers, or carbon nanotubes as the infrared radiation absorber, and both components a) and b).

wherein component a) comprises silica particles, calcium carbonate particles, or both silica and calcium carbonate particles as the non-infrared radiation absorber filler.

15. The laser-engraveable composition of any of embodiments 1 to 14 comprising one or more elastomeric rubbers in an amount of at least 30 weight % and up to and including 80 weight %, based on total laser-engraveable composition weight, the laser-engraveable composition further comprising:

at least 2 phr and up to and including 30 phr of a near-infrared radiation absorber, and at least 3 phr and up to and including 20 phr of a peroxide composition or a composition comprising a mixture of a sulfur composition and a peroxide composition, wherein the weight ratio of the near-infrared radiation absorber to the vulcanizing composition is from 1:10 to 10:1, and the peroxide composition comprises a mixture of at least first and second peroxides, wherein the first peroxide has a $t_{90}$ value of at least 1 minute and up to and including 6 minutes as measured at 160° C., and the second peroxide has a $t_{90}$ value of at least 8 minutes and up to and including 20 minutes as measured at 160° C., and 16. A laser-engraveable composition comprising one or more elastomeric rubbers in an amount of at least 30 weight % and up to and including 80 weight %, based on the total dry laser-engraveable composition weight, wherein the laser-engraveable composition further comprises at least 10 parts and up to and including 100 parts of one or more CLCB EPDM elastomeric rubbers, based on parts per hundred of the total weight of elastomeric rubbers (phr) in the laser-engraveable composition, wherein the laser-engraveable composition further comprises at least one radiation absorber, and a vulcanizing composition chosen from the group consisting of: (1) a sulfur composition, (2) a peroxide composition, or (3) a composition comprising a mixture of a sulfur composition and a peroxide composition.

17. A flexographic printing precursor that is laser-engraveable to provide a relief image, the flexographic printing precursor comprising a laser-engraveable layer prepared from a laser-engraveable composition of any of embodiments 1 to 16.

18. The flexographic printing precursor of embodiment 17 wherein the laser-engraveable layer has a A torque ($M_A=M_H-M_L$) of at least 10 and up to and including 25.

19. The flexographic printing precursor of embodiment 17 or 18 further comprising a substrate over which the laser-engraveable layer is disposed, wherein the substrate comprises one or more layers of a metal, fabric, or polymeric film, or a combination thereof.

20. The flexographic printing precursor of any of embodiments 17 to 19 further comprising a substrate over which the laser-engraveable layer is disposed, wherein the substrate comprises a fabric web disposed over a polyester support.

21. The flexographic printing precursor of any of embodiments 17 to 20 wherein the laser-engraveable layer has a dry thickness of at least 50 µm and up to and including 4,000 µm.

22. A method for providing a flexographic printing member comprising:

imaging the laser-engraveable layer of the flexographic printing precursor of any of embodiments 17 to 21 using near-infrared radiation to provide a flexographic printing member with a relief image in the resulting laser-engraved layer.

23. The method of embodiment 22 comprising imaging using a semiconductor infrared radiation laser or array of such lasers at a minimum fluence level of at least 20 $J/cm^2$ and up to and including 1,000 $J/cm^2$.

24. The method of embodiment 22 or 23 comprising imaging using a high-powered laser ablating imager device.

25. The method of any of embodiments 22 to 24 comprising imaging to provide a minimum dry relief image depth of at least 50 p.m.

26. The method of any of embodiments 22 to 25 comprising imaging using two or more laser diodes, each diode emitting near-infrared radiation at one or more wavelengths, in order to provide the same or different relief image depths relative to the outer surface of the laser-engraveable layer.

27. The method of any of embodiments 22 to 26 for providing a flexographic printing plate or flexographic printing sleeve.

28. A system for providing a flexographic printing member, comprising:

the flexographic printing precursor of any of embodiments 17 to 27, a source of imaging near-infrared radiation that is capable of emitting imaging near-infrared radiation and that is selected from the group consisting of a laser diode, a multi-emitter laser diode, a laser bar, a laser stack, a fiber laser, or a combination thereof, and a set of optical elements coupled to the one or more sources of imaging near-infrared radiation to direct imaging near-infrared radiation from the one or more sources of imaging near-infrared radiation onto the flexographic printing member.

29. A method for preparing the flexographic printing precursor of any of embodiments 17 to 21 comprising:

providing the laser-engraveable composition of any of embodiments 1 to 16, and formulating the laser-engraveable composition into a laser-engraveable layer.

The following Examples are provided to illustrate the practice of this invention and are not meant to be limiting in any manner.

Trigonox® 29 is 1,1-bis(t-butylperoxy)-3,3,5-trimethylcyclohexane.

Trigonox® 101 is 2,5-dimethyl-2,5-di(t-butylperoxy)hexane.

Trigonox® 17 is butyl 4,4-di(t-butylperoxy)valerate.
Perkadox® BC is dicumyl peroxide.
Perkadox® 14/40 is di(t-butylperoxyisopropyl)benzene.

All are available commercially, for example, from AkzoNobel.

Comparative Example 1

One hundred parts by weight of a non-CLCB EPDM elastomeric rubber was masticated in a two roller mill. The grade of non-CLCB EPDM elastomeric rubber was based on ethylidene norborene and was the commercial grade KEP240 (sold by Kumho). Mastication was continued until the shapeless lump in the mill had been formed into a semi-transparent sheet. This sheet was rolled up and fed into a Banbury mixer operating between 70° C. and 80° C. During the mixing, the following components (parts per hundred parts rubber) were added individually in the order shown below:

| | |
|---|---|
| Kep240 | 100 phr |
| Stearic Acid | 1 phr |
| Zinc oxide | 5 phr |
| Carbon black | 24 phr |
| Vinyl Silane | 1.5 phr |
| N,N'-(m-phenylene)dimaleimide 70% active co-reagent (HVA-2) | 2.14 phr |
| Calcium Carbonate | 30 phr |
| Silica | 30 phr |
| Mineral oil | 10 phr. |

The formulation was mixed for about 20 minutes in the Banbury mixer until a constant stress reading could be observed on the Banbury mixer. The resulting composition was removed from the Banbury mixer as a homogenous lump that was fed onto a two roller mill and 10 phr of di-(t-butylperoxyisopropyl)benzene were then added.

The Mooney viscosity of the resulting laser-engraveable layer formulation was about 75 as Mooney viscosities should be between 30 and 80 or more likely, between 40 and 60. Higher and lower viscosities than these values will not allow processability on a two roller mill.

The milled formulation was then fed through a calendar at a temperature of 30-80° C. in combination with a fabric base. The calendar gap was pre-set to desired thickness requirements. The resulting continuous roll of laminated laser-engraveable layer and fabric web was fed into an autoclave at 135° C. for a suitable period of time, and after cooling the continuous roll to room temperature, it was laminated to a 125 µm poly(ethylene terephthalate) film and post-cured in an autoclave at 120° C. to provide a flexographic printing plate precursor.

The non-CLCB EPDM elastomeric rubber was present in the dry laser-engraveable layer in an amount of 48% based on the total dry layer weight. Moreover, the near-infrared radiation absorber (carbon black) was present in the dry laser-engraveable layer in an amount of 24 phr, and the total of the inorganic, non-infrared radiation absorber fillers (zinc oxide, calcium carbonate, and silica) was 65 phr. Thus, the weight ratio of the near-infrared radiation absorber to the inorganic, non-infrared radiation absorber fillers was about 1:3. The amount of the vulcanizing composition (including peroxide and co-reagent) used to prepare the laser-engraveable layer was 6 phr, and the weight ratio of the near-infrared radiation absorber to the vulcanizing composition in the laser-engraveable layer formulation was 4:1.

The laser-engraveable layer of this flexographic printing plate precursor was then continuously ground to provide a uniform thickness using a buffing machine. The flexographic printing plate precursor had a Durometer hardness of 89. It was cut to an appropriate size and placed on a laser-engraving plate imager where an excellent, sharp, and deep relief image was produced that was then used on a flexographic printing press to produce hundreds of thousands of sharp, clean impressions. The compression set for this flexographic printing plate was found to be 35% as measured according to ASTM D 395 Method B.

Comparative Example 2

Comparative Example 1 was repeated except that the laser-engraveable layer was formulated using a mixture of 8 parts of CLCB EPDM elastomeric rubber (Keltan 2340A) and 92 parts of the non-CLCB EPDM elastomeric rubber. The Mooney viscosity for the laser-engraveable layer formulation was not measured but it was hard to masticate. The resulting flexographic plate precursor had a Durometer hardness of 87.

The amount of CLCB EPDM elastomeric rubber in the resulting laser-engraveable layer was about 4 weight %, and the non-CLCB EPDM elastomeric rubber was present in that layer in an amount of 43 weight %. Moreover, the infrared radiation absorber (carbon black) is present in the dry laser-engraveable layer in an amount of 24 phr, and the total of the inorganic, non-infrared radiation absorber fillers (zinc oxide, calcium carbonate, and silica) is 65 phr. Thus, the weight ratio of the infrared radiation absorber to the inorganic, non-infrared radiation absorber fillers was about 1:3. The amount of the vulcanizing composition (including peroxide and co-reagent) used to prepare the laser-engraveable layer was 6 phr, and the weight ratio of the infrared radiation absorber to the vulcanizing composition in the laser-engraveable layer formulation was 4:1.

The resulting flexographic printing precursor was cut to an appropriate size and placed on a laser-engraving plate imager to product a relief image that was used on a flexographic printing press to produce a few hundred impressions that were of inferior printed quality. In addition, manufacturability was less desirable compared to Comparative Example 1.

Invention Example 1

Comparative Example 1 was repeated but a CLCB EPDM elastomeric rubber (Keltan 2340A) was substituted for the noted non-CLCB EPDM elastomeric rubber. For the laser-engraveable layer formulation, the Mooney viscosity was 65 and the formulation was easier to masticate. The resulting flexographic printing plate precursor had a Durometer hardness of 82. It was cut to an appropriate size and placed on a laser-engraving plate imager where an excellent, sharp, and deep relief image was produced that was used on a flexographic printing press to produce hundreds of thousands of sharp, clean impressions. The compression set for this flexographic printing plate was 13% as measured according to ASTM D 395 Method B. The CLCB EPDM elastomeric rubber was present in the dry laser-engraveable layer in an amount of 48% based on the total dry layer weight.

Moreover, the near-infrared radiation absorber (carbon black) was present in the dry laser-engraveable layer in an amount of 24 phr, and the total of the inorganic, non-infrared radiation absorber fillers (zinc oxide, calcium carbonate, and silica) was 65 phr. Thus, the weight ratio of the near-infrared radiation absorber to the inorganic, non-infrared radiation absorber fillers was about 1:3. The amount of the vulcanizing composition (including peroxide and co-reagent) used to prepare the laser-engraveable layer was 6 phr, and the weight ratio of the near-infrared radiation absorber to the vulcanizing composition in the laser-engraveable layer formulation was 4:1.

This example demonstrates that the flexographic printing plate precursors of this invention can be more easily manufactured during formation of the laser-engraveable layer when a CLCB EPDM elastomeric rubber was present in the laser-engraveable layer and also that the compression set was much lower. The compression set represents the resistance to changes in the flexographic printing plate during printing.

Invention Example 2

Comparative Example 1 was repeated except that the laser-engraveable layer was formulated using a mixture of 60 parts of CLCB EPDM elastomeric rubber (Keltan 2340A) and 40 parts of the non-CLCB EPDM elastomeric rubber. The Mooney viscosity for the laser-engraveable layer formulation was 58 and was easy to masticate. The resulting flexographic plate precursor had a Durometer hardness of 80.

The amount of CLCB EPDM elastomeric rubber in the resulting laser-engraveable layer was 28 weight %, and the non-CLCB EPDM elastomeric rubber was present in that layer in an amount of 19 weight %. Moreover, the near-infrared radiation absorber (carbon black) was present in the dry laser-engraveable layer in an amount of 24 phr, and the total of the inorganic, non-infrared radiation absorber fillers (zinc oxide, calcium carbonate, and silica) was 65 phr. Thus, the weight ratio of the near-infrared radiation absorber to the inorganic, non-infrared radiation absorber fillers was about 1:3. The amount of the vulcanizing composition (including peroxide and co-reagent) used to prepare the laser-engraveable layer was 6 phr, and the weight ratio of the near-infrared radiation absorber to the vulcanizing composition in the laser-engraveable layer formulation was 4:1.

The resulting flexographic printing precursor was cut to an appropriate size and placed on a laser-engraving plate imager to product an excellent, sharp, and deep relief image that was used on a flexographic printing press to produce hundreds of thousands of sharp, clean impressions. The compression set for this flexographic printing plate precursor was found to be 28% as measured according to ASTM D 395 Method B.

Invention Example 3

Comparative Example 1 was repeated except that the laser-engraveable layer was formulated using a mixture of 40 phr of CLCB EPDM elastomeric rubber (Kam 2340A), 20 phr of the high molecular weight non-CLCB EPDM elastomeric rubber, and 20 phr of low molecular weight non-CLCB EPDM. The Mooney viscosity for the laser-engraveable layer formulation was 52 and it was easy to masticate. The resulting flexographic plate precursor had a Durometer hardness of 80.

The amount of CLCB EPDM elastomeric rubber in the resulting laser-engraveable layer was 19 weight %, the high molecular weight non-CLCB EPDM elastomeric rubber was present in an amount of 19 weight % and the low molecular weight non-CLCB EPDM elastomeric rubber was present in an amount of 9 weight %. Thus, the weight ratio of the high molecular weight non-CLCB EPDM to the low molecular weight non-CLCB EPDM was 2:1. Moreover, the near-infrared radiation absorber (carbon black) was present in the dry laser-engraveable layer in an amount of 24 phr, and the total of the inorganic, non-infrared radiation absorber fillers (zinc oxide, calcium carbonate, and silica) was 65 phr. Thus, the weight ratio of the infrared radiation absorber to the inorganic, non-infrared radiation absorber fillers was about 1:3. The amount of the vulcanizing composition (including peroxide and co-reagent) used to prepare the laser-engraveable layer was 6 phr, and the weight ratio of the infrared radiation absorber to the vulcanizing composition in the laser-engraveable layer formulation was 4:1.

The resulting flexographic printing precursor was cut to an appropriate size and placed on a laser-engraving plate imager to produce an excellent, sharp, and deep relief image that was used on a flexographic printing press to produce hundreds of thousands of sharp, clean impressions. The compression set for this flexographic printing plate precursor was found to be 7% as measured according to ASTM D 395 Method B.

Invention Examples 1, 2, and 3 and Comparative Example 1 demonstrate that the use of a CLCB EPDM elastomeric rubber, either as part or the entire amount of the elastomeric rubbers in the laser-engraveable layer, provides a beneficial improvement in the manufacture of the flexographic printing plate precursors and also improves compression set values. The presence of the CCLB EPDM elastomeric rubber also lowers the Durometer hardness of the laser-engraveable layer.

Invention Example 4

The following evaluations are presented to demonstrate the effect of using specific peroxides in a vulcanization composition in the laser-engraveable layer formulation.

To see the advantage of peroxide composition, the following parameters were considered:

$M_H$—the maximum torque (or 8 torque) that is an indication of the cross linking density in a laser-engraveable layer. A higher maximum torque is better.

$M_L$—the minimum torque that is an indication of the elastic stiffness of the non-vulcanized formulation according to ASTM D-5289.

$t_{90}$ that is the time required for a formulation to reach 90% of $M_H$. This time should be suitable for production. That is, it cannot be too fast because it would provide insufficient time for the formulation to be cured, and it cannot be too slow so that flexographic printing plate precursor production is inefficient.

The following Peroxide Compositions 1 through 4 were examined in a laser-engraveable layer formulation like that described in Invention Example 2 above. The amounts shown in the following TABLE I refer to the phr amount of the peroxides in each laser-engraveable layer formulation, and the results are also summarized.

TABLE I

| Composition | 1 | 2 | 3 | 4 |
|---|---|---|---|---|
| Trigonox ® 101 | | | 2 | 4 |
| Trigonox ® 29 | 5 | 4 | | |
| Trigonox ® 17 | 3 | 4 | 6 | 4 |
| $t_{90}$ (seconds) | 1.3 | 1.4 | 4.1 | 7.8 |
| Δ ($M_H$-$M_L$) | 16 | 16.2 | 16.3 | 18.8 |

The results shown in TABLE I demonstrate that an optimum laser-engraveable formulation was prepared by Peroxide Compositions 3 and 4 containing a mixture of Trigonox® 101 with Trigonox® 17, which compositions provided a high enough torque and a useful $t_{90}$ value that would enable good production efficiency. Peroxide Composition 4 provided a higher torque value but it also had a higher $t_{90}$ (thus, too slow reactivity) that would make the mixture undesirable for efficient production. Peroxide Compositions 1 and 2 provided a sufficient torque value but the $t_{90}$ values were too low (thus, too fast reactivity) for production methods.

The choice of useful peroxide(s) in the laser-engraveable layer and compositions of this invention can depend upon the optimal cure time ($t_{90}$) in minutes at various temperatures. These data (taken from "Cross linking elastomers and thermoplastics", a 2010 AkzoNobel technical brochure that is available from their web site) are shown in the following TABLE II for several commercially available peroxides:

TABLE II

| | $t_{90}$ at 160° C. (minutes) |
|---|---|
| Perkadox ® BC | 16 |
| Trigonox ® 29 | 2 |
| Trigonox ® 17 | 6 |

Comparative Example 3

Invention example 4 was repeated with the laser-engraveable layer formulated using different combinations of peroxides. In this case, two peroxides having the same group $t_{90}$ value were evaluated. The components of the laser-engraveable layer formulation are shown in the following TABLE III in phr.

This example demonstrates the use of two peroxides within the group of "first" peroxides that have $t_{90}$ value of at least 1 minute and up to and including 6 minutes at 160° C.

TABLE III

| | Amount (phr) |
|---|---|
| CLCB EPDM | 60 |
| Non-CLCB EPDM | 40 |
| Silica | 30 |
| Calcium carbonate | 30 |
| Carbon black | 24 |
| Zinc oxide | 5 |
| Paraffin oil | 10 |
| Stearic acid | 1 |
| HVA-2 | 2.14 |
| Trigonox ® 29 | 5 |
| Trigonox ® 17 | 3 |

The formulation samples were evaluated and the following values obtained: $M_A$=15 and $t_{90}$=1.2. It can be seen from these results that the torque value was lower than desired and the $t_{90}$ value was too fast for practical production methods (too fast of reaction time).

Invention Example 5

The amount of the near-infrared radiation absorber, such as a carbon black, in the laser-engraveable layer also affects layer sensitivity. However, there can be an optimum range of amount (phr), beyond which the layer sensitivity begins to decrease. It was found that the near-infrared radiation absorber is useful in the laser-engraveable layer in an amount of at least 2 phr and up to and including 30 phr, and optimally in an amount of at least 5 phr and up to and including 25 phr. This was demonstrated in several laser-engraveable layer formulations like that described above for Invention Example 2 wherein the carbon black was varied. The sensitivity of the flexographic printing plate precursor to laser engraving energy was measured as the amount of energy per unit area to engrave a certain depth. The results are shown in the following TABLE IV.

TABLE IV

| | Carbon Black (phr) | | | | | | |
|---|---|---|---|---|---|---|---|
| | 1 | 6 | 12 | 18 | 24 | 30 | 36 |
| Sensitivity [J/cm² · µm] | 0.7 | 0.6 | 0.55 | 0.59 | 0.55 | 0.8 | 0.9 |

These results demonstrate that optimal laser engraving sensitivity was achieved using a carbon black in an amount of at least 5 phr and up to and including 25 phr. Lower and higher amounts of carbon black resulted in reduced sensitivity.

Invention Examples 6

In addition, the amount of the inorganic, non-infrared radiation absorber filler(s) in the laser-engraveable layer can affect the layer hardness (evaluated as Durometer hardness) and the manufacturability (especially calendering, evaluated as Mooney viscosity). These data were measured at 100° C. for four minutes using a Tech Pro Visctech viscometer according to Standard D-1646. An assessment of the amount of one inorganic, non-infrared radiation absorber filler, silica, is shown in the following TABLE V when the indicated amounts of silica were formulated into laser-engraveable layer formulations like that described above in Comparative Example 1.

TABLE V

| Silica (phr) | 25 | 45 | 65 | 85 |
|---|---|---|---|---|
| Mooney Viscosity | 22 | 40 | 72 | 124 |
| Durometer Hardness | 67 | 75 | 82 | 87 |
| Torque value $M_H$ | 12 | 17 | 26 | 33 |

It can be seen from these data that higher silica amounts (in phr) causes an increase the Mooney viscosity of the laser-engraveable layer formulation. As the Mooney viscosity was increased in the laser-engraveable formulation, calendering problems increased. In addition, higher silica amounts cause an increase in resulting laser-engraveable layer hardness, which can affect printing performances. Thus, it is best to include the silica, with or without other inorganic non-infrared radiation absorber filler(s), in the laser-engraveable layer formulation (and resulting precursor layer) in an amount of at least 1 phr and up to and including 80 phr, or typically in an amount of at least 20 phr and up to and including 70 phr.

Invention Example 7

It is also useful to include a mineral oil in the laser-engraveable layer formulation. For example, the presence and amount of a mineral oil can affect the calendering process, hardness of the resulting laser-engraveable layer, and the Mooney viscosity. Paraffin oil was used in laser-engraveable layer formulations like that described above in Invention Example 2 in the amounts shown in TABLE VI below. The results in Mooney viscosity of the laser-engraveable layer formulations and the resulting laser-engraveable layer are also shown in TABLE VI.

TABLE VI

| Paraffin Oil (phr) | 20 | 35 | 50 |
|---|---|---|---|
| Mooney Viscosity | 40 | 29 | 18 |
| Durometer Hardness | 74 | 73 | 70 |

These data indicate that the Mooney viscosity values decreased with the increasing amount of mineral oil. As these values decreased, there were increasing problems with calendering, for example, the laser-engraveable layer formulation could be torn. Thus, when a mineral oil is present in the laser-engraveable layer formulation, it is useful to use it in an amount of at least 10 phr and up to and including 30 phr.

Invention Examples 8 and 9

Two laser-engraveable formulations were prepared according to the present invention. One formulation contained one peroxide while the other formulation comprised a mixture of peroxides. The formulations contained the components shown below in TABLE VII (in phr).

TABLE VII

| | Invention Example 8 | Invention Example 9 |
|---|---|---|
| CLCB EPDM elastomeric rubber | 60 | 60 |
| Non-CLCB EPDM elastomeric rubber | 40 | 40 |
| Silica | 30 | 30 |
| Calcium carbonate | 30 | 30 |
| Carbon black | 24 | 24 |
| Zinc oxide | 5 | 5 |
| Paraffin oil | 10 | 10 |
| Stearic acid | 1 | 1 |
| HVA-2 | 2.14 | 2.14 |
| Trigonox ® 29 | 8 | 5 |
| Trigonox ® 101 | 0 | 3 |
| Δ ($M_H$-$M_L$) | 16.2 | 18 |
| $t_{90}$ | 0.82 | 6.4 |

The data shown in TABLE VII demonstrate that the laser-engraveable layer formulation of Invention Example 9 comprising a mixture of first and second peroxides exhibited a higher Δ torque value than the laser engraveable layer formulation for Invention Example 8. The higher torque value provided a higher crosslinking density in the resulting laser-engraveable layer in a flexographic printing plate precursor. The $t_{90}$ value for Invention Example 8 was too fast for most manufacturing conditions, but this can be modified by using a different peroxide.

Invention Example 10

A laser-engraveable composition and flexographic printing plate precursor were prepared according to the present invention using the laser-engraveable composition described in Invention Example 2. The flexographic printing plate precursor was laser-engraved using a $CO_2$ engraving laser with machine settings for an ALE Engraving system-Semi-Sealed 500 Watt $CO_2$ to provide a relief image. A Z-laser was used, which Z-laser has light source that allows 3-dimensional contours of moving and static objects to be imaged. The flexographic printing plate precursor was successfully engraved by the $CO_2$ laser to provide a relief image having straight lines and line width in the machine direction.

Invention Example 11

Invention example 2 was repeated except that 24 phr of conductive carbon black (Sterling C, Akrochem Corporation)

was used in place of non-conductive regular carbon black. A flexographic printing plate precursor having the laser-engraveable layer was imaged to provide a relief image similarly to Invention Example 2 except that the resulting flexographic printing plate exhibited the added advantage of improved antistatic performance.

The invention has been described in detail with particular reference to certain preferred embodiments thereof, but it will be understood that variations and modifications can be effected within the spirit and scope of the invention.

The invention claimed is:

1. A laser-engraveable composition comprising one or more elastomeric rubbers in an amount of at least 30 weight % and up to and including 80 weight %, based on the total laser-engravable composition weight, wherein the laser-engraveable composition further comprises at least 10 parts and up to and including 100 parts of one or more controlled long chain branching ethylene-propylene-diene (CLCB EPDM) elastomeric rubbers, based on parts per hundred of the total weight of elastomeric rubbers (phr) in the laser-engraveable composition,
 the laser-engraveable composition further comprising at least the following component b), with or without the following component a):
 a) at least 2 phr and up to and including 30 phr of a near-infrared radiation absorber and at least 1 phr and up to and including 80 phr of an inorganic, non-infrared radiation absorber filler, wherein the weight ratio of the near-infrared radiation absorber to the inorganic, non-infrared radiation absorber filler is from 1:40 to 30:1, and
 b) at least 2 phr and up to and including 30 phr of a near-infrared radiation absorber, and at least 3 phr and up to and including 20 phr of a vulcanizing composition that comprises a mixture of at least first and second peroxides,
 wherein the first peroxide has a $t_{90}$ value of at least 1 minute and up to and including 6 minutes as measured at 160° C., and the second peroxide has a to value of at least 8 minutes and up to and including 20 minutes as measured at 160° C., and
 wherein the weight ratio of the near-infrared radiation absorber to the vulcanizing composition is from 1:10 to 10:1, and
 comprising a conductive or non-conductive carbon black, carbon fibers, or carbon nanotubes as the near-infrared radiation absorber.

2. The laser-engraveable composition of claim 1 comprising component a) wherein the weight ratio of the near-infrared radiation absorber to the inorganic, non-infrared radiation absorber filler is from 1:30 to 20:1.

3. The laser-engraveable composition of claim 1 that exhibits a $t_{90}$ value of at least 1 minute and up to and including 17 minutes at 160° C.

4. The laser-engraveable composition of claim 1 further comprising one or more non-CLCB EPDM elastomeric rubbers.

5. The laser-engraveable composition of claim 4 wherein the weight ratio of the one or more CLCB EPDM elastomeric rubbers to the one or more non-CLCB EPDM elastomeric rubbers is from 1:3 to 5:1.

6. The laser-engraveable composition of claim 4 wherein the weight ratio of the one or more CLCB EPDM elastomeric rubbers to the one or more non-CLCB EPDM elastomeric rubbers is from 1:1 to 3:1.

7. The laser-engraveable composition of claim 1 further comprising:
 a) a high molecular weight non-CLCB EPDM elastomeric rubber that has a molecular weight of at least 20,000,
 b) a low molecular weight non-CLCB EPDM elastomeric rubber that has a molecular weight of at least 2,000 and less than 20,000, or
 c) a mixture of a high molecular weight non-CLCB EPDM elastomeric rubber and a low molecular weight non-CLCB EPDM elastomeric rubber at a weight ratio of the high molecular weight non-CLCB EPDM elastomeric rubber to the low molecular weight non-CLCB EPDM elastomeric rubber of from 1:1 to 4:1.

8. A laser-engraveable composition comprising one or more elastomeric rubbers in an amount of at least 30 weight % and up to and including 80 weight %, based on the total laser-engravable composition weight, wherein the laser-engraveable composition further comprises at least 10 parts and up to and including 100 parts of one or more controlled long chain branching ethylene-propylene-diene (CLCB EPDM) elastomeric rubbers, based on parts per hundred of the total weight of elastomeric rubbers (phr) in the laser-engraveable composition,
 the laser-engraveable composition further comprising both of the following components a) and b):
 a) at least 2 phr and up to and including 30 phr of near-infrared radiation absorber and at least 1 phr and up to and including 80 phr of an inorganic, non-infrared radiation absorber filler, wherein the weight ratio of the near-infrared radiation absorber to the inorganic, non-infrared radiation absorber filler is from 1:40 to 30:1, and
 b) at least 2 phr and up to and including 30 phr of the near-infrared radiation absorber, and at least 3 phr and up to and including 20 phr of a vulcanizing composition that comprises a mixture of at least first and second peroxides,
 wherein the first peroxide has a $t_{90}$ value of at least 1 minute and up to and including 6 minutes as measured at 160° C., and the second peroxide has a $t_{90}$ value of at least 8 minutes and up to and including 20 minutes as measured at 160° C., and
 wherein the weight ratio of the near-infrared radiation absorber to the vulcanizing composition is from 1:10 to 10:1, and
 comprising a conductive or non-conductive carbon black, carbon fibers, or carbon nanotubes as the near-infrared radiation absorber,
 wherein component a) comprises silica particles, calcium carbonate particles, or both silica and calcium carbonate particles as the non-infrared radiation absorber filler.

9. A flexographic printing precursor that is laser-engraveable to provide a relief image, the flexographic printing precursor comprising a laser-engraveable layer prepared from a laser-engraveable composition comprising one or more elastomeric rubbers in an amount of at least 30 weight % and up to and including 80 weight %, based on the total laser-engraveable composition weight, the laser-engraveable composition comprising at least 10 parts and up to and including 100 parts of one or more controlled long chain branching ethylene-propylene-diene (CLCB EPDM) elastomeric rubbers, based on parts per hundred of the total weight of elastomeric rubbers (phr) in the laser-engraveable composition,
 the laser-engraveable composition further comprising one or both of the following components a) and b):
 a) at least 2 phr and up to and including 30 phr of a near-infrared radiation absorber and at least 1 phr and up to and including 80 phr of an inorganic, non-infrared radiation absorber filler, wherein the weight ratio of the near-infrared radiation absorber to the inorganic, non-infrared radiation absorber filler is from 1:40 to 30:1, and b) at least 2 phr and up to and including 30 phr of a near-infrared radiation absorber, and at least 3 phr and up to and including 20 phr of a vulcanizing composition that comprises a mixture of at least first and second peroxides, wherein the first peroxide has a $t_{90}$ value of at least 1 minute and up to and including 6 minutes as measured at 160° C., and the second peroxide has a $t_{90}$ value of at least 8 minutes and up to and including 20 minutes as measured at 160° C., and wherein the weight ratio of the infrared radiation absorber to the vulcanizing composition is from 1:10 to 10:1, the flexographic printing precursor further comprising a substrate over which the laser-engraveable layer is disposed, wherein the substrate comprises a fabric web disposed over a polymeric film.

10. The flexographic printing precursor of claim 9 wherein the laser-engraveable layer has a Δ torque ($M_\Delta = M_H - M_L$) of at least 10 and up to and including 25.

11. The flexographic printing precursor of claim 9 wherein the laser-engraveable composition comprises component a) wherein the weight ratio of the near-infrared radiation absorber to the inorganic, non-infrared radiation absorber filler is from 1:30 to 20:1.

12. The flexographic printing precursor of claim 9 wherein the laser-engraveable composition further comprises one or more non-CLCB EPDM elastomeric rubbers and the one or more CLCB EPDM elastomeric rubbers are present in an amount of at least 15 phr and up to and including 70 phr.

13. The flexographic printing precursor of claim 9 wherein the weight ratio of the one or more CLCB EPDM elastomeric rubbers to the one or more non-CLCB EPDM elastomeric rubbers is from 1:3 to 5:1.

14. The flexographic printing precursor of claim 9 wherein the weight ratio of the one or more CLCB EPDM elastomeric rubbers to the one or more non-CLCB EPDM elastomeric rubbers is from 1:1 to 3:1.

15. The flexographic printing precursor of claim 9 wherein the laser-engraveable composition further comprises:
a) a high molecular weight non-CLCB EPDM elastomeric rubber that has a molecular weight of at least 20,000,
b) a low molecular weight non-CLCB EPDM elastomeric rubber that has a molecular weight of at least 2,000 and less than 20,000, or
c) a mixture of the high molecular weight non-CLCB EPDM elastomeric rubber and the low molecular weight non-CLCB EPDM elastomeric rubber at a weight ratio of the high molecular weight non-CLCB EPDM elastomeric rubber to the low molecular weight non-CLCB EPDM elastomeric rubber of from 1:1 to 4:1.

16. The flexographic printing precursor of claim 9 wherein carbon black is present as the near-infrared radiation absorber in an amount of at least 5 phr and up to and including 30 phr.

17. The flexographic printing precursor of claim 9 wherein the laser-engraveable layer has a dry thickness of at least 50 μm and up to and including 4,000 μm.

18. The flexographic printing precursor of claim 9 wherein the laser-engraveable composition further comprises carbon nanotubes, carbon fibers, or a conductive carbon black that has a dibutyl phthalate (DBP) absorption value of at least 110 ml/100 g, wherein the carbon nanotubes, carbon fibers, or conductive carbon black is present in an amount of at least 3 phr and up to and including 30 phr.

19. A system for providing a flexographic printing member, comprising:
the flexographic printing precursor of claim 9,
a source of imaging near-infrared radiation that is capable of emitting imaging near-infrared radiation and that is selected from the group consisting of a laser diode, a multi-emitter laser diode, a laser bar, a laser stack, a fiber laser, or a combination thereof, and
a set of optical elements coupled to the one or more sources of imaging near-infrared radiation to direct imaging near-infrared radiation from the one or more sources of imaging near-infrared radiation onto the flexographic printing member.

20. A method for preparing the flexographic printing precursor of claim 9 comprising:
providing a laser-engraveable composition comprising one or more elastomeric rubbers in an amount of at least 30 weight % and up to and including 80 weight %, based on the total laser-engraveable composition weight, the laser-engraveable composition further comprising at least 10 parts and up to and including 100 parts of one or more controlled long chain branching ethylene-propylene-diene (CLCB EPDM) elastomeric rubbers, based on parts per hundred of the total weight of elastomeric rubbers (phr) in the laser-engraveable composition,
the laser-engraveable composition further comprising one or both of the following components a) and b):
a) at least 2 phr and up to and including 30 phr of a near-infrared radiation absorber and at least 1 phr and up to and including 80 phr of an inorganic, non-infrared radiation absorber filler, wherein the weight ratio of the near-infrared radiation absorber to the inorganic, non-infrared radiation absorber filler is from 1:40 to 30:1, and
b) at least 2 phr and up to and including 30 phr of the near-infrared radiation absorber that is a carbon black, and at least 3 phr and up to and including 20 phr of a vulcanizing composition that comprises a mixture of at least first and second peroxides,
wherein the first peroxide has a $t_{90}$ value of at least 1 minute and up to and including 6 minutes as measured at 160° C., and the second peroxide has a $t_{90}$ value of at least 8 minutes and up to and including 20 minutes as measured at 160° C., and
wherein the weight ratio of the carbon black to the vulcanizing composition is from 1:5 to 5:1, and
formulating the laser-engraveable composition into a laser-engraveable layer on a substrate comprising one or more layers of a fabric on a polymeric film.

21. A method for preparing a flexographic printing precursor comprising:
providing a laser-engraveable composition comprising one or more elastomeric rubbers in an amount of at least 30 weight % and up to and including 80 weight %, based on total laser-engraveable composition weight,
the laser-engraveable composition further comprising:
at least 2 phr and up to and including 30 phr of a near-infrared radiation absorber, and at least 3 phr and up to and including 20 phr of a peroxide composition or a composition comprising a mixture of a sulfur composition and a peroxide composition,
wherein the weight ratio of the near-infrared radiation absorber to the vulcanizing composition is from 1:10 to 10:1, and the peroxide composition comprises a mixture of at least first and second peroxides, wherein the first peroxide has a $t_{90}$ value of at least 1 minute and up to and including 6 minutes as measured at 160°

C., and the second peroxide has a $t_{90}$ value of at least 8 minutes and up to and including 20 minutes as measured at 160° C., and formulating the laser-engraveable composition into a laser-engraveable layer.

22. The method of claim 21 wherein the laser-engraveable composition exhibits a $t_{90}$ value of at least 1 minute and up to and including 17 minutes at 160° C.

* * * * *